United States Patent
Akiyama

(10) Patent No.: US 9,811,767 B2
(45) Date of Patent: Nov. 7, 2017

(54) IMAGE PROCESSING APPARATUS, IMAGE PROCESSING METHOD AND PROGRAM

(71) Applicant: Takumi Akiyama, Kanagawa (JP)

(72) Inventor: Takumi Akiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/007,334

(22) Filed: Jan. 27, 2016

(65) Prior Publication Data

US 2016/0224873 A1   Aug. 4, 2016

(30) Foreign Application Priority Data

Feb. 3, 2015  (JP) ................................ 2015-019062
Jul. 16, 2015  (JP) ................................ 2015-142381

(51) Int. Cl.
*G06K 15/16* (2006.01)

(52) U.S. Cl.
CPC .................... *G06K 15/16* (2013.01)

(58) Field of Classification Search
None
See application file for complete search history.

(56) References Cited

U.S. PATENT DOCUMENTS

| | | | | |
|---|---|---|---|---|
| 5,715,497 A | * | 2/1998 | Ueda ...................... | G03G 15/60 271/227 |
| 8,427,714 B2 | | 4/2013 | Kato et al. | |
| 2002/0181024 A1 | * | 12/2002 | Morimoto .......... | H04N 1/40075 358/3.15 |
| 2007/0206025 A1 | * | 9/2007 | Oka ...................... | G06T 11/40 345/611 |
| 2010/0053410 A1 | * | 3/2010 | Yoshii .................. | G06K 9/3216 348/333.11 |
| 2011/0026084 A1 | * | 2/2011 | Kato .................. | H04N 1/00702 358/474 |
| 2014/0212049 A1 | * | 7/2014 | Honda .................. | G06T 7/0085 382/199 |

FOREIGN PATENT DOCUMENTS

| | | |
|---|---|---|
| JP | 2008-147976 | 6/2008 |
| JP | 2011-171992 | 9/2011 |
| JP | 4853555 | 1/2012 |
| JP | 2013-098720 | 5/2013 |

* cited by examiner

Primary Examiner — Fan Zhang
(74) Attorney, Agent, or Firm — IPUSA, PLLC

(57) ABSTRACT

There is provided an image processing apparatus for performing image processing on image data generated based on an image of a recording medium conveyed in a conveyance direction, comprising: a horizontal edge detection unit configured to detect a horizontal edge included in the image data; a slanted edge detection unit configured to detect a slanted edge adjoining the horizontal edge included in the image data; a calculation unit configured to calculate coordinates of a distal end of the slanted edge, the other distal end of the slanted edge adjoining the horizontal edge; and a coordinate calculating unit configured to calculate coordinates related to an edge of the recording medium based on the horizontal edge and the coordinates of the distal end calculated by the calculation unit.

13 Claims, 21 Drawing Sheets

FIG.6A
FIG.6B
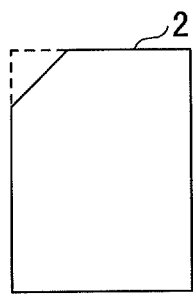
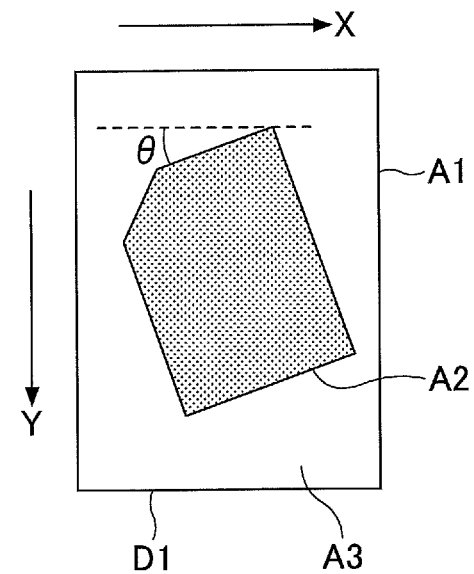

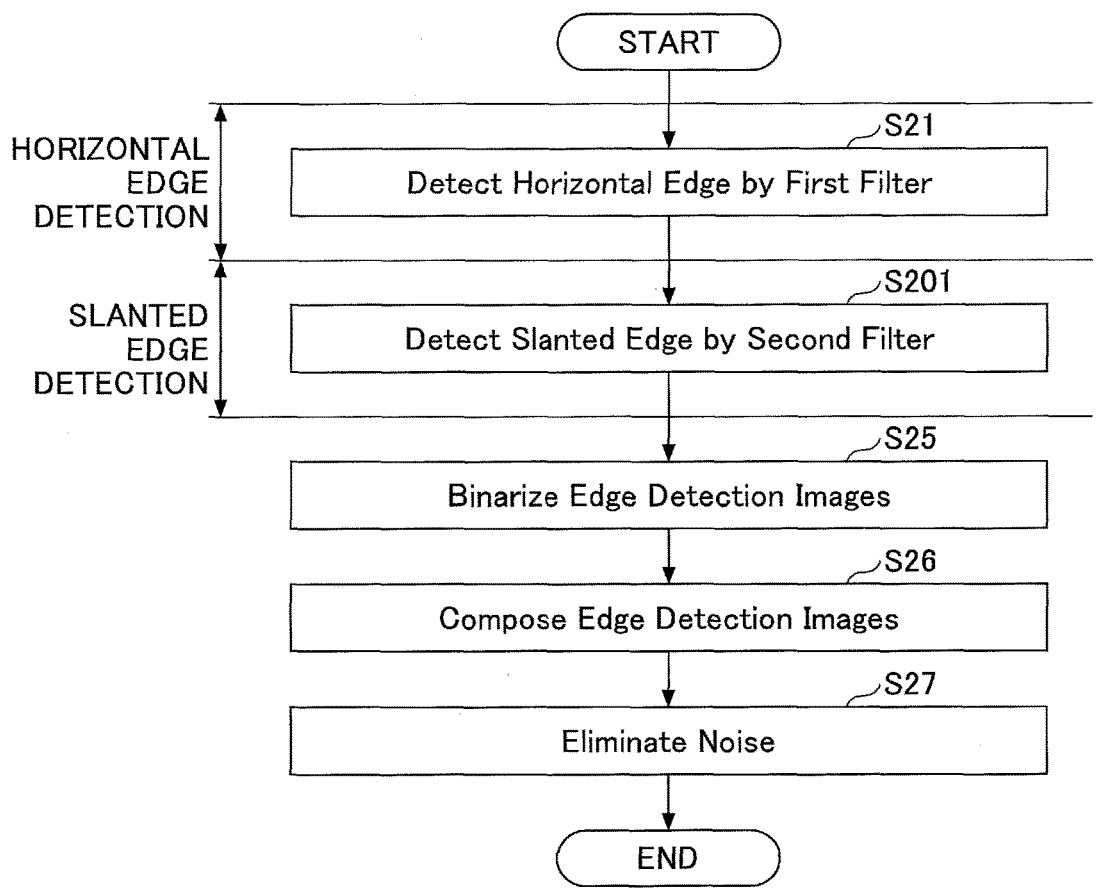

FIL1

FIL2

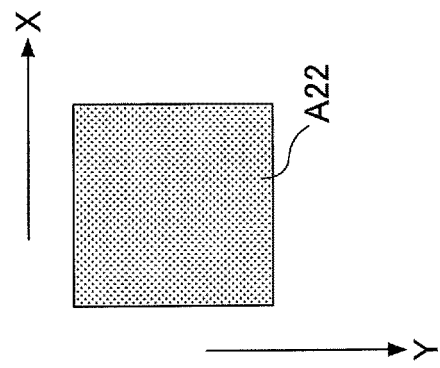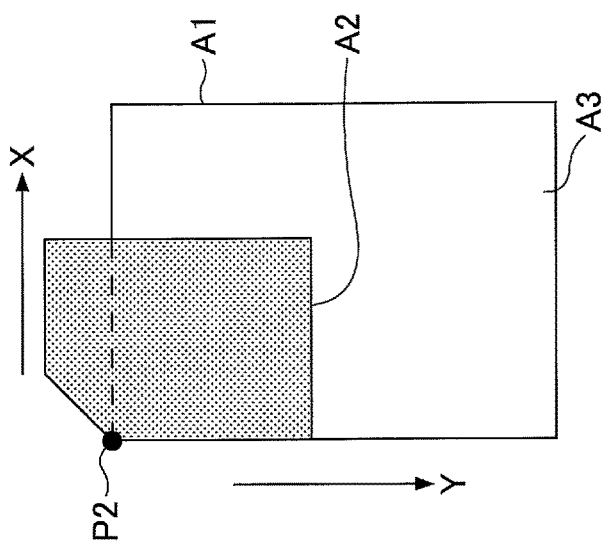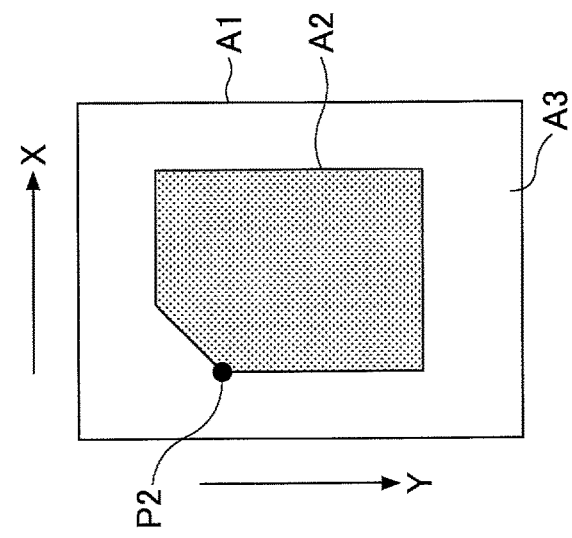

IMAGE PROCESSING APPARATUS, IMAGE PROCESSING METHOD AND PROGRAM

BACKGROUND OF THE INVENTION

1. Field of the Invention

The present disclosure relates to image processing apparatuses, image forming systems, image forming methods and programs.

2. Description of the Related Art

Conventionally, an image reading apparatus such as a scanner for reading an image formed on a document such as a paper is known. Also, a method is known, in which so called skew correction for correcting an inclination is performed when the document is read by the reading apparatus being inclined with respect to a main scanning direction or a sub-scanning direction.

Among methods for correcting the inclination of the document, a method is known, in which distal end edge data is searched through an edge extraction process to correct the inclination of the document based on the searched distal end edge data (for example, Patent Document 1).

Also, a method is known, in which dusts and dirt on a reading surface of the document is detected to distinguish a vertical line in the document from vertical lines caused by the dusts and dirt, thereby correcting the inclination of the document (for example, see Patent Document 2).

However, in a case where a recording medium such as a paper is folded by a user, etc., an edge portion of the recording medium may be chipped. When the edge portion of the recording medium is chipped as described above, coordinates of the edge portion of the recording medium may be calculated, in the inclination correction of the recording medium, based on an edge portion caused by the fold.

RELATED ART DOCUMENT

Patent Document

[Patent Document 1]: Japanese Unexamined Patent Application Publication No. 2013-98720
[Patent Document 2]: Japanese Unexamined Patent Application Publication No. 2011-171992

SUMMARY OF THE INVENTION

An object of disclosure of the present technology is to provide an image processing apparatus capable of calculating the coordinates of the edge portion of the recording medium even if the recording medium lacks the edge portion.

The following configuration is adopted to achieve the aforementioned object.

In one aspect of the embodiment, there is provided an image processing apparatus for performing image processing on image data generated based on an image of a recording medium conveyed in a conveyance direction, comprising: a horizontal edge detection unit configured to detect a horizontal edge included in the image data; a slanted edge detection unit configured to detect a slanted edge adjoining the horizontal edge included in the image data; a calculation unit configured to calculate coordinates of a distal end of the slanted edge, the other distal end of the slanted edge adjoining the horizontal edge; and a coordinate calculating unit configured to calculate coordinates related to an edge of the recording medium based on the horizontal edge and the coordinates of the distal end calculated by the calculation unit.

Other objects, features and advantages of the present invention will become more apparent from the following detailed description when read in conjunction with the accompanying drawings.

BRIEF DESCRIPTION OF THE DRAWINGS

FIG. 6A is a diagram for illustrating an example recording medium and an image of the recording medium scanned by the image processing apparatus of the present embodiment.

FIG. 6B is another diagram for illustrating an example recording medium and an image of the recording medium scanned by the image processing apparatus of the present embodiment.

FIG. 16 is a flowchart for illustrating an example edge detection process performed by the image processing apparatus of the second embodiment.

FIG. 19D is another diagram for illustrating an example processing result of the entire process performed by the image processing apparatus of an example comparison.

FIG. 19E is another diagram for illustrating an example processing result of the entire process performed by the image processing apparatus of an example comparison.

FIG. 19F is another diagram for illustrating an example processing result of the entire process performed by the image processing apparatus of an example comparison.

DETAILED DESCRIPTION OF THE PREFERRED EMBODIMENTS

In the following, embodiments will be described with reference to accompanying drawings.

First Embodiment

<General Arrangement>

Figure 1:
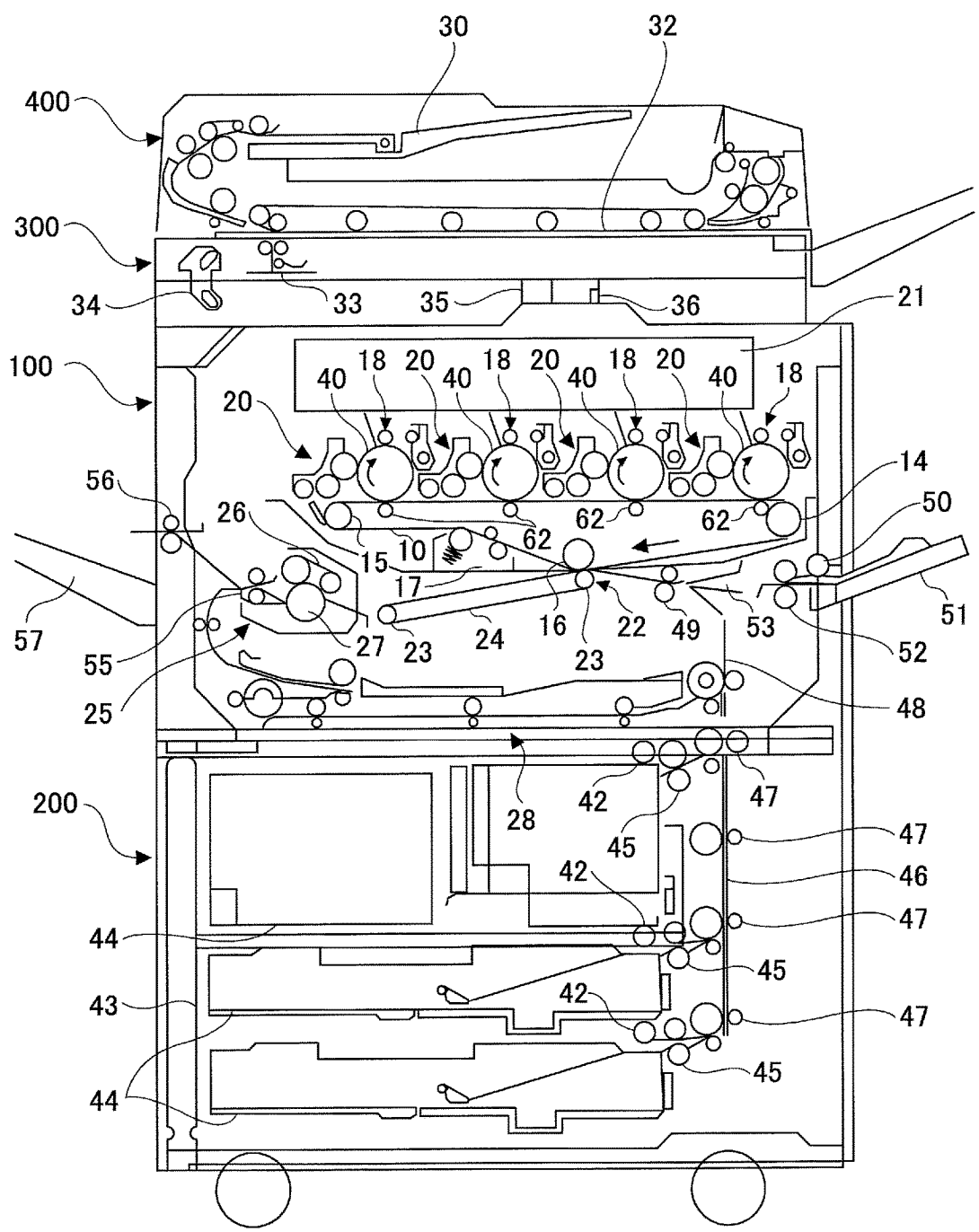
FIG. 1 is a diagram for illustrating an example general arrangement of an image processing apparatus of the present embodiment.

FIG. 1 is a diagram for illustrating an example general arrangement of an image processing apparatus of the present embodiment. Specifically, for example, the image processing apparatus 100 is an electrophotographic image processing apparatus including a secondary transfer mechanism referred to as a tandem system. In the following, the image processing apparatus 100 will be described.

The image processing apparatus 100 includes an intermediate transfer unit. The intermediate transfer unit includes an intermediate transfer belt 10. In FIG. 1, the intermediate transfer belt 10 is supported by three supporting rollers 14-16 to rotate clockwise.

An intermediate transfer body cleaning unit 17 eliminates toner remaining on the intermediate transfer belt 10 upon performing the image formation process.

An image formation device 20 includes a cleaning unit, a charging unit 18, a discharging unit, a developing unit and a photoconductor unit 40.

In FIG. 1, the image processing apparatus 100 includes the image formation devices 20 corresponding to respective colors of yellow (Ye), magenta (M), cyan (C) and black (K). In the following, the respective colors may be referred to as the reference characters shown in the parentheses. Also, the respective image formation devices 20 are disposed between a first supporting roller 14 and a second supporting roller 15. Additionally, in the example shown in FIG. 1, the image formation devices 20 corresponding to the respective colors of yellow (Ye), magenta (M), cyan (C) and black (K) are arranged in the aforementioned order in a conveyance direction of the intermediate transfer belt 10. Further, the image formation devices 20 are detachable from the image processing apparatus 100.

A light beam scanning device 21 irradiates a photoconductor drum included in the respective photoconductor units 40 corresponding to the respective colors with light beam for forming image.

The secondary transfer unit 22 includes two rollers 23 and a secondary transfer belt 24. Specifically, the secondary transfer belt 24 is an endless belt. Also, the secondary transfer belt 24 is supported by two rollers 23 to rotate. Further, in FIG. 1, the roller 23 and the secondary transfer belt 24 are disposed so as to press up the intermediate transfer belt 10, thereby pressing the intermediate transfer belt 10 against a third roller 16. Also, the secondary transfer belt 24 transfers an image formed on the intermediate transfer belt 10 to a recording medium. Additionally, for example, the recording medium is a paper or a plastic sheet.

A fixing unit 25 performs a fixing process. Also, the fixing unit 25 includes a fixing belt 26 and a pressure roller 27. Additionally, the fixing belt 26 is an endless belt. Further, the fixing belt 26 and the pressure roller 27 are disposed so as to press the pressure roller 27 against the fixing belt 26. In the fixing process, first, the recording medium on which a toner image is transferred is sent into the fixing unit 25. Then, the fixing unit 25 performs heating. Thus, the fixing unit 25 fixes the image on the recording medium.

A sheet inversion unit 28 inverts a front surface and a back surface of the recording medium. The sheet inversion unit 28 is used when an image is formed on the back surface after forming an image on the front surface.

An Auto Document Feeder (ADF) 400 conveys the recording medium mounted on a feeder 30 onto a contact glass 32 upon a start button being pressed by the user. On the other hand, in a case where the recording medium is not mounted on the feeder 30, the Auto Document Feeder 400 activates an image reading unit 300 to read the recording medium mounted on the contact glass 32 by the user.

The image reading unit 300 includes a first carriage 33, a second carriage 34, an image forming lens 35, a CCD (Charge Coupled Device) 36 and a light source.

The image reading unit 300 operates the first carriage 33 and the second carriage 34 so as to read the recording medium on the contact glass 32.

The light source included in the first carriage 33 emits the light toward the contact glass 32. Then, the light emitted from the light source of the first carriage 33 is reflected at the surface of the recording medium on the contact glass 32. The reflected light is further reflected at a first mirror included in the first carriage 33 to the second carriage 34. Then, the light reflected to the second carriage 34 forms an image on the CCD 36 serving as a reading sensor through the image forming lens 35.

The image processing apparatus 100 generates respective image data corresponding to colors of yellow (Ye), magenta (M), cyan (C) and black (K) by using the CCD 36.

Upon the start button being pressed by the user or an instruction to form the image being given from an external apparatus such as a PC (Personal Computer), the image processing apparatus 100 rotates the intermediate transfer belt 10. Further, the image processing apparatus 100 rotates the intermediate transfer belt 10 upon an instruction of facsimile output being given.

Upon the intermediate transfer belt 10 starting to rotate, the image formation device 20 starts an image formation process. Upon the toner image being transferred, the recording medium is sent into the fixing unit 25. Then, the fixing unit 25 performs the fixing process to form the image on the recording medium.

A feeder table 200 includes a feeding roller 42, a feeding unit 43, a separation roller 45 and a carrying roller unit 46. Also, the feeding unit 43 may include a plurality of feeding trays 44. Further, the carrying roller unit 46 includes a carrying roller 47.

The feeder table 200 selects one of the feeding rollers 42. Then, the feeder table 200 rotates the selected feeding roller 42.

The feeding unit 43 selects one of the feeding trays 44 to feed the recording medium from the selected feeding tray 44. Then, the fed recording media are separated into one recording medium by the separation roller 45 and sent into the carrying roller unit 46. The carrying roller unit 46 conveys the recording medium to the image processing apparatus 100 with the carrying roller 47.

Then, the recording medium is conveyed to a resist roller 49 by the carrying roller unit 46. The recording medium conveyed to the resist roller 49 is abutted and stopped at the resist roller 49. Further, when the toner image is transferred to the secondary transfer unit 22, the recording medium is sent into the secondary transfer unit 22 at timing for performing the transfer on a certain position.

Additionally, the recording medium may be fed from a manual paper feeding tray 51. For example, upon the recording medium is fed from the manual paper feeding tray 51, the image processing apparatus 100 rotates the feeding roller 50 and the feeding roller 52. Then, the feeding roller 50 and the feeding roller 52 separates one recording medium from the recording media mounted on the manual paper feeding tray 51. The feeding roller 50 and the feeding roller 52 convey the separated recording medium to a feeding path 53. Then the recording medium conveyed to the feeding path 53 is further conveyed to the resist roller 49. Additionally, processes after the recording medium being conveyed to the resist roller 49 are the same as the processes in a case where the recording medium is fed from the feeder table 200.

The toner image is fixed on the recording medium in the fixing unit 25, and the recording medium is ejected from the image processing apparatus 100. The recording medium ejected from the fixing unit 25 is conveyed to an ejecting roller 56 by a changeover claw 55. Further, the ejecting roller 56 conveys the recording medium to a paper ejection tray 57.

Also, the changeover claw 55 may convey the recording medium ejected from the fixing unit 25 to a sheet inversion unit 28. In this case, the sheet inversion unit 28 inverts the front surface and the back surface of the conveyed recording medium. Then, an image formation on the back surface of the inverted recording medium (so called both-side printing) is performed, and the recording medium is conveyed to the paper ejection tray 57.

Meanwhile, the toner remaining on the intermediate transfer belt 10 is removed by the intermediate transfer body cleaning unit 17. Upon the toner remaining on the intermediate transfer belt 10 being removed, the image processing apparatus 100 is ready to perform next image formation.

Additionally, the image processing apparatus 100 may not include a device for performing the image formation such as the image formation device 20.

<Hardware Configuration>

Figure 2:
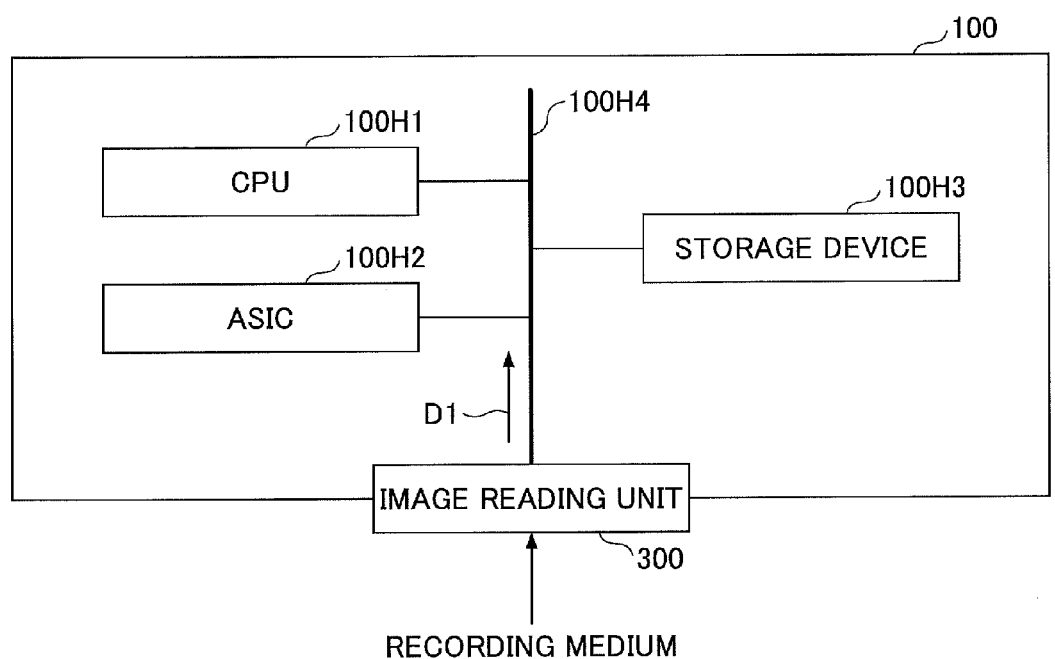
FIG. 2 is a block diagram for illustrating an example hardware configuration of the image processing apparatus of the present embodiment.

FIG. 2 is a block diagram for illustrating an example hardware configuration of the image processing apparatus of the present embodiment. Specifically, the image processing apparatus 100 includes a CPU (Central Processing Unit) 100H1, a ASIC (Application Specific Integrated Circuit) 100H2, a storage device 100H3, and a bus 100H4.

The CPU 100H1 is a computing device for performing calculation and respective data processing of the image processing apparatus 100. Further, the CPU 100H1 is a control device for controlling respective hardware units included in the image processing apparatus 100.

The ASIC 100H2 is an electronic circuit for performing respective processes and respective data processing of image data etc., in the image processing of the image processing apparatus 100. Additionally, the ASIC 100H2 may be a PDL (Programmable Logic Device) such as a FPGA (Field-Programmable Gate Array).

The storage device 100H3 stores data, programs, and setting information used in the image processing apparatus 100. Also, the storage device 100H3 is a memory, and the like. Additionally, the storage device 100H3 may include an auxiliary storage such as a hard disk.

The hardware units shown in FIG. 2 and respective units including the image reading unit 300 shown in FIG. 1, etc., are connected through the bus 100H4, thereby transmitting and receiving respective data including the image data D1 between each other.

<Example Skew Correction>

Figure 3A:
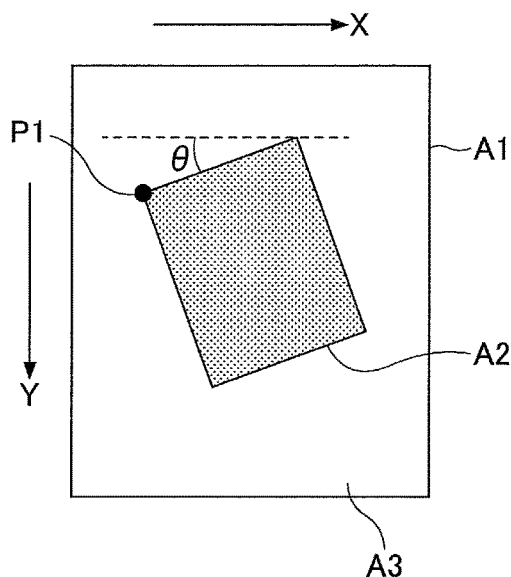
FIG. 3A is a diagram for illustrating an example skew correction of the present embodiment.

FIG. 3A-FIG. 3D are diagrams for illustrating an example skew correction of the present embodiment. Specifically, the recording medium and the image that is formed on the recording medium are scanned as shown in FIG. 3A. Additionally, in FIG. 3A-FIG. 3D, a vertical direction (up and down direction) in a space of FIG. 3A-FIG. 3D corresponds to a conveyance direction Y of the recording medium, while a horizontal direction (left and right direction) in the space of FIG. 3A-FIG. 3D corresponds to a orthogonal direction X orthogonal to the conveyance direction Y.

Further, in FIG. 3A-FIG. 3D, a range that can be scanned by the CCD 36 shown in FIG. 1 is referred to as scan range A1, and a range within the scan range A1 in which the recording medium is placed is referred to as an image range A2. Meanwhile, in FIG. 3A-FIG. 3D, a range within the scan range A1 excluding the image range A2 is referred to as a background range A3. Also, as shown in FIG. 3A, skew of the image range A2 occurs, where an angle of the image range A2 with respect to the orthogonal direction X (hereinafter referred to as "skew angle") becomes θ.

In the following, an example process will be described, in which the image processing apparatus 100 shown in FIG. 1 performs the skew correction on the image shown in FIG. 3A to generate the image data D1 shown in FIG. 2. First, the image processing apparatus 100 calculates the skew angle θ.

Figure 3B:
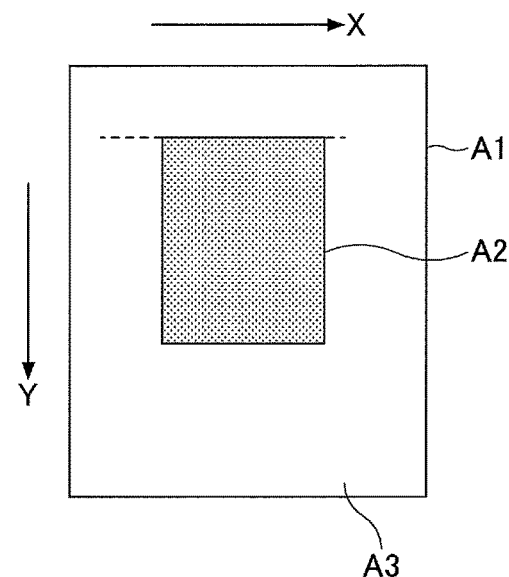
FIG. 3B is another diagram for illustrating an example skew correction of the present embodiment.

Then, as shown in FIG. 3B, the image processing apparatus 100 performs a correction operation for rotating the image so that the skew angle θ becomes "0" to generate the image data D1. Specifically, the image area A2 is rotated based on the calculated skew angle θ, thereby placing the image area A2 as shown in FIG. 3B.

Figure 3C:
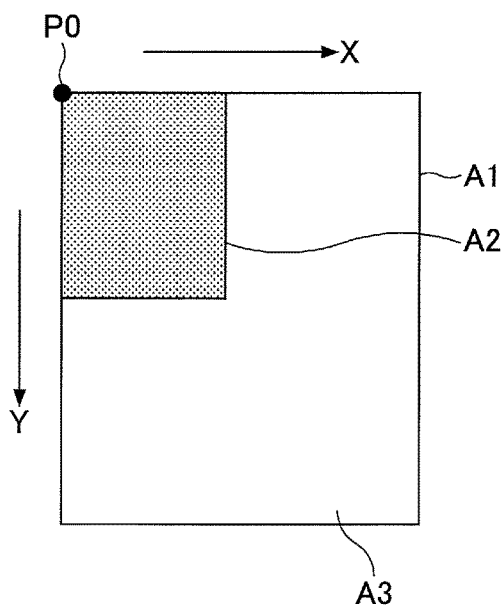
FIG. 3C is another diagram for illustrating an example skew correction of the present embodiment.
Figure 3D:
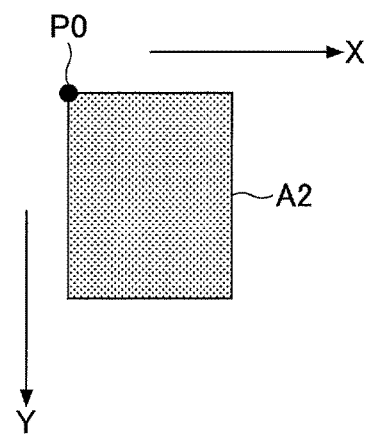
FIG. 3D is another diagram for illustrating an example skew correction of the present embodiment.

Additionally, it is preferable that the background area A3 is omitted in the image of the image data D1. Therefore, the image processing apparatus 100 performs a correction operation for eliminating the background area A3 from the image shown in FIG. 3B. Also, the image processing apparatus 100 detects a coordinate P0 that is located at the most upper left side within the coordinates existing within the image range A2 (hereinafter referred to as an image range origin). Then, as shown in FIG. 3B and FIG. 3C, the image processing apparatus 100 rotates the image range A2 so that the image range origin P0 is located at an origin of the scan range A1. Further, the image processing apparatus 100 eliminates the background area A3 from the scan range A1 so as to generate an image shown in FIG. 3D in which the image range A2 is shown.

Also, in a case where the recording medium is conveyed by the Auto Document Feeder 400 (FIG. 1), since carrying rollers are unlikely disposed evenly at left and right edge of the recording medium, the skew is likely to occur. Therefore, in a case where the recording medium is conveyed by the Auto Document Feeder 400 to scan the image, the image processing apparatus 100 preferably performs the skew correction. That is, the image processing apparatus 100 can reduce the occurrence of the skew conveyed by the Auto Document Feeder 400 by performing the skew correction.

<Example Entire Process>

Figure 4:
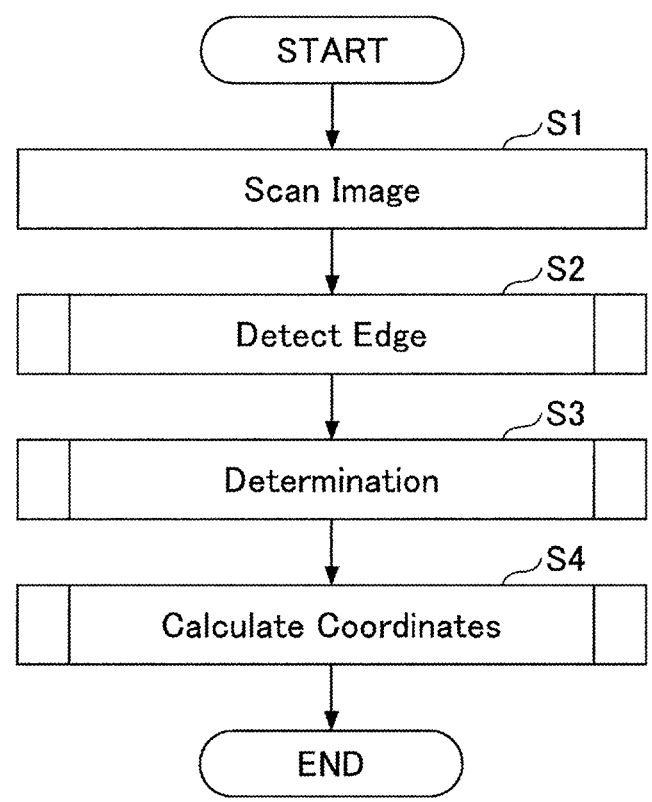
FIG. 4 is a flowchart for illustrating an entire process of the image processing apparatus of the present embodiment.

FIG. 4 is a flowchart for illustrating an entire process of the image processing apparatus of the present embodiment. Additionally, among a series of correction operations of the skew correction shown in FIG. 3A-FIG. 3D, the entire process shown in FIG. 4 corresponds to the correction operation performed on the image shown in FIG. 3A.

<Example Image Scanning (Step S1)>

In step S1, the image processing apparatus 100 scans the image formed on the recording medium. Specifically, upon the recording medium being placed on the contact glass or the Auto Document Feeder and the user, etc., giving an instruction to scan the image, the image processing apparatus 100 scans the image formed on the recording medium with the CCD and the like. In step S1, the image processing apparatus 100 generates the image data of the image shown in FIG. 3A.

<Example Edge Detection Process (Step S2)>

In step S2, the image processing apparatus performs an edge detection process.

Figure 5:
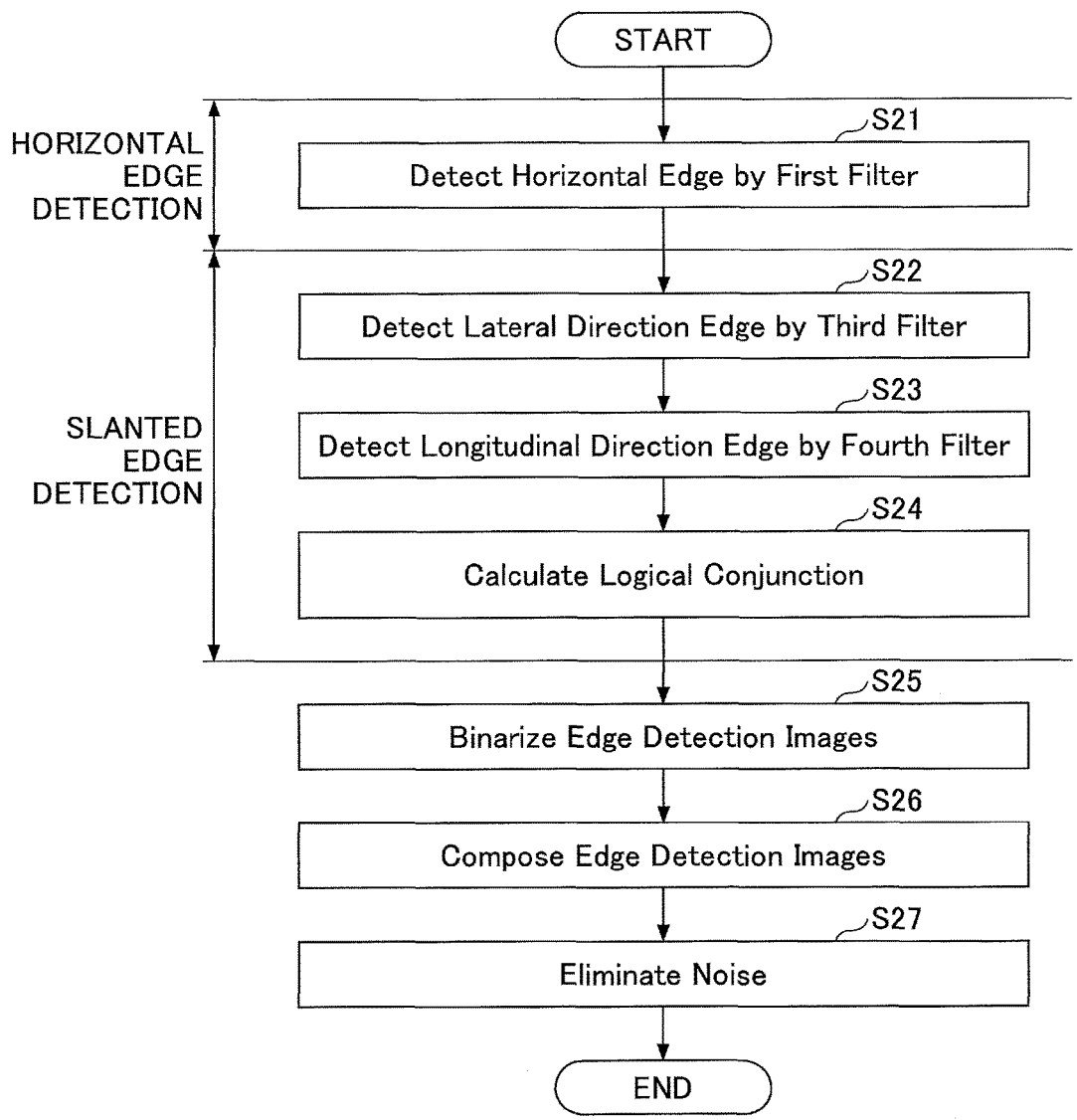
FIG. 5 is a flowchart for illustrating an example edge detection process of the image processing apparatus of the present embodiment.

FIG. 5 is a flowchart for illustrating an example edge detection process of the image processing apparatus of the present embodiment.

<Example Process for Detecting Horizontal Edge by First Filter (Step S21)>

In step S21, the image processing apparatus 100 performs a process for detecting a horizontal edge by a first filter. Additionally, the first filter is a filter for performing first derivation, and detects an edge parallel to the orthogonal direction X (FIG. 3) or an edge close to be parallel to the orthogonal direction X.

<Example Process for Detecting Lateral Direction Edge by Third Filter (Step S22)>

In step S22, the image processing apparatus performs a process for detecting a lateral direction edge including the horizontal edge and a slanted edge (herein after simply referred to as a lateral direction edge) by a third filter. Additionally, the third filter is a filter for performing first derivation, and detects an edge whose angle with respect to the orthogonal direction X (FIG. 3) is within a range between parallel and slant.

<Example Process for Detecting Longitudinal Direction Edge by Fourth Filter (Step S23)>

In step S23, the image processing apparatus performs a process for detecting a longitudinal direction edge including a vertical edge and a slanted edge (hereinafter simply referred to as a longitudinal direction edge) by a fourth filter. Additionally, the fourth filter is a filter for performing first derivation, and detects an edge whose angle with respect to the orthogonal direction X (FIG. 3) is within a range between vertical and slant.

<Example Process for Calculating Logical Conjunction of Detection Results of Lateral Direction Edge and Longitudinal Direction Edge (Step S24)>

In step S24, the image processing apparatus performs a process for calculating a logical conjunction (AND) of the detection results of the lateral direction edge and the longitudinal direction edge. That is, the image processing apparatus calculates the logical conjunction of the detection result in step S22 and the detection result in step S23. Upon the logical conjunction being calculated, the slanted edge is detected since the logical conjunction indicates the edge that has been included in both of the detection results.

<Example Binarization of Edge Detection Image (Step S25)>

In step S25, the image processing apparatus performs a binarization process on respective images indicating the edges detected in step S21 and step S24. Specifically, in step S25, for example, the image processing apparatus makes a pixel value be a value corresponding to white, etc., in a case where the pixel values are greater than or equal to a predetermined threshold value, where the pixel values of respective pixels included in the image are checked. On the other hand, if the pixel value is less than the predetermined threshold value, the image processing apparatus makes the pixel value be a value corresponding to black, etc.

<Example Composition of Edge Detection Images (Step S26)>

In step S26, the image processing apparatus composes the respective edge detection images. Specifically, the image processing apparatus calculates a logical addition (OR) of a horizontal edge detection image and a slanted edge detection image generated through the binarization process performed in step S25.

<Example Noise Elimination (Step S27)>

In step S27, the image processing apparatus eliminates noise from the image generated through the composition in step S26. Specifically, in step S27, the image processing apparatus eliminates the noise included in the background range A3 (FIG. 3) by using a low-pass filter and the like.

<Example Processing Result of Edge Detection Process>

FIG. 6A and FIG. 6B are diagrams for illustrating an example recording medium and example image of the recording medium scanned by the image processing apparatus of the present embodiment. In the following, descriptions are given in a case where the recording medium 2 shown in FIG. 6A is scanned by the image processing apparatus in step S1 shown in FIG. 4 to generate the image data. Specifically, as shown in FIG. 6A, an upper left edge portion of the recording medium 2 is likely to be chipped. For example, in a case where a user, etc., folds the recording medium 2 or brakes the recording medium 2, the edge portion of the recording medium 2 may be chipped.

The recording medium 2 is scanned by the image processing apparatus to generate the image data shown in FIG. 6B in step S1. In the following, descriptions are given assuming that the image data D1 shown in FIG. 6B is generated in step S1.

Figure 7:
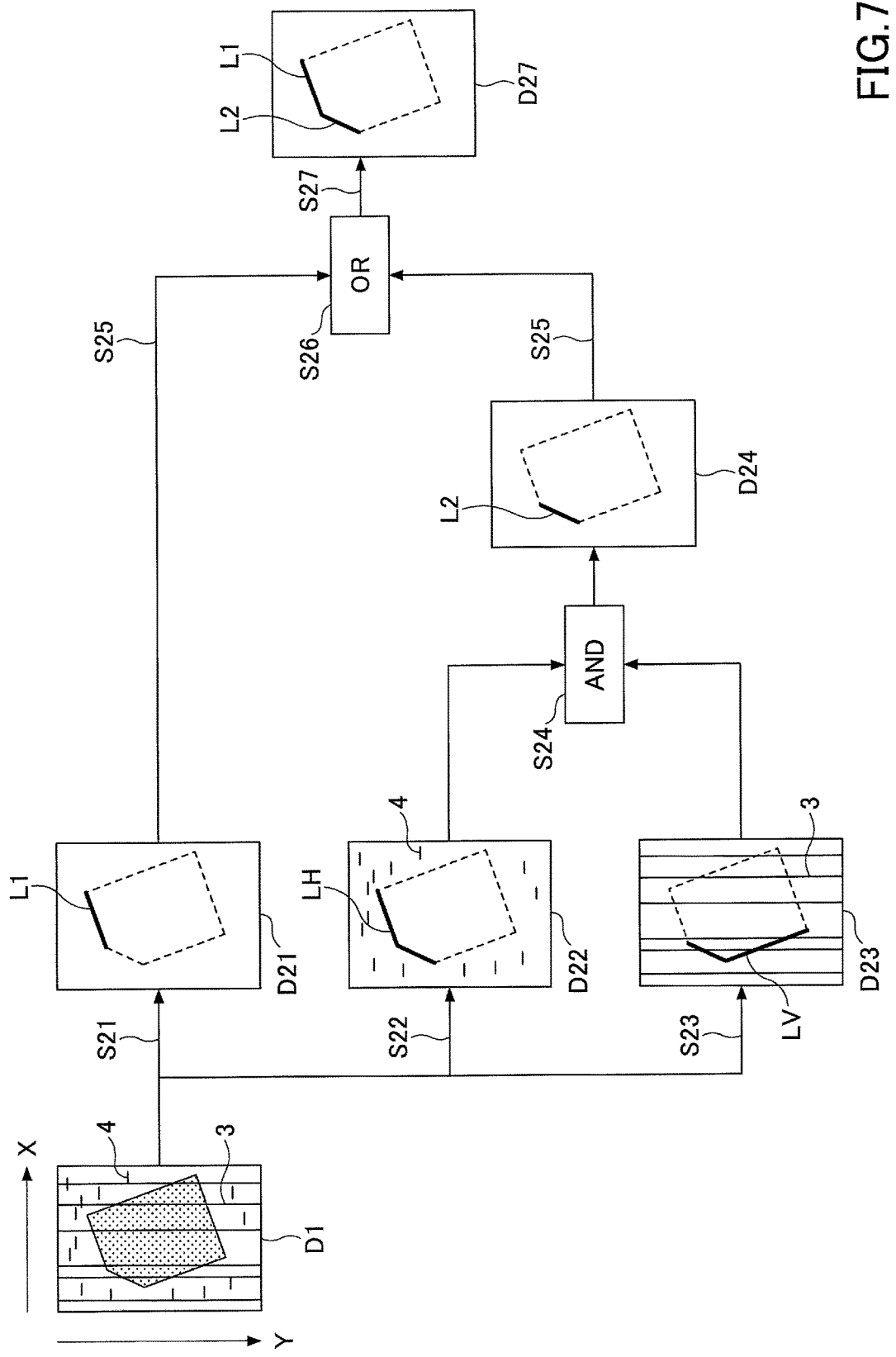
FIG. 7 is a diagram for illustrating an example processing result of the edge detection process performed by the image processing apparatus of the first embodiment.

FIG. 7 is a diagram for illustrating an example processing result of the edge detection process performed by the image processing apparatus of the first embodiment. FIG. 7 illustrates an example flow of processes in a case where the process shown in FIG. 5 is performed on the image data D1 shown in FIG. 6B. As shown in FIG. 7, noise such as a plurality of vertical streaks 3 and horizontal streaks 4 is included in the image data D1.

Upon the process of the first filter being performed on the image data D1 (step S21), first image detection data D21 in which the horizontal edge L1 is detected is generated. The horizontal edge L1 is detected based on the background area and a shade of an upper side of an area corresponding to the recording medium. Since the shade of the upper side of the recording medium can be found regardless of color or shape of the recording medium, robustness to types of the recording medium and to an amount of the noise included in the background area can be improved.

Upon the process of the third filter being performed on the image data D1 (step S22), second detection image data D22 is generated as the detection result of the lateral direction edge detection, in which a lateral direction edge LH is detected. Also, the horizontal streaks 4 are likely to be included in the second detection image data D22.

Further, upon the process of the fourth filter being performed on the image data D1 (step S23), third detection image data D23 is generated as the detection result of the longitudinal direction edge, in which the longitudinal direction edge LV is detected. Also, vertical streaks 3 are likely to be included in the third detection image data D23.

Subsequently, in the edge detection process, upon the logical conjunction of the second detection image data D22 and the third detection image data D23 being calculated (step S24), fourth detection image data D24 is generated, in which the slanted edge L2 is detected. In step S24, since the logical conjunction is calculated, the edges included in both the second detection image data D22 and the third detection image data D23 are detected in the fourth detection image data D24. That is, the vertical streaks 3 and the horizontal streaks 4 are unlikely to be detected in the fourth detection image data D24 since the vertical streaks 3 and the horizontal streaks 4 are likely to be detected in one of the second detection image data D22 and the third detection image data D23. Therefore, the fourth detection image data D24 is image data for showing the slanted edges L2, while the vertical streaks 3 and the horizontal streaks 4 are unlikely to be included in the fourth detection image data D24. Also, since the slanted edge L2 is detected by calculating the logical conjunction of the lateral direction edge LH and the longitudinal direction edge LV, the slanted edges L2 of various angles can be detected.

Subsequently, the image processing apparatus respectively performs a binarization process on the first detection image data D21 and the fourth detection image data D24 (step S25). Further, the image processing apparatus calculates a logical addition of the respective binarized images (step S26), and fifth detection image data D27 is generated upon the image processing apparatus performing the noise elimination (step S27).

As described above, when the edge detection process shown in FIG. 5 is performed, the image processing apparatus can generate image data, in which the horizontal edges L1 and the slanted edges L2 are included while the vertical streaks 3 and the horizontal streaks 4 are unlikely to be included.

<Example Filter>

Figure 8C:
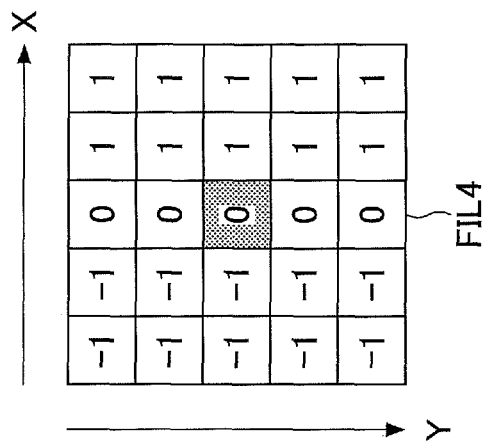
FIG. 8C is another diagram for illustrating an example filter of the first embodiment.
Figure 8B:
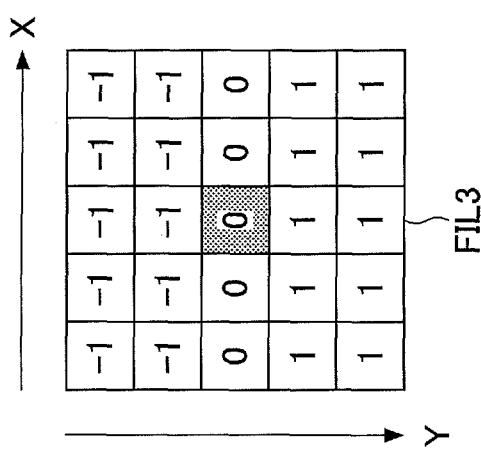
FIG. 8B is another diagram for illustrating an example filter of the first embodiment.
Figure 8A:
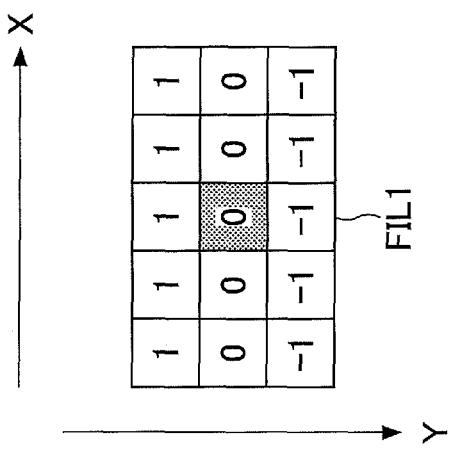
FIG. 8A is a diagram for illustrating an example filter of the first embodiment.

FIG. 8A-FIG. 8C are diagrams for illustrating example filters of the first embodiment. The first filter FIL1, the third filter FIL3 and the fourth filter FIL4 are filters for performing first derivation. That is, for example, the first filter FIL1, the third filter FIL3 and the fourth filter FIL4 are so called prewitt filters. However, the respective filters may be achieved by a laplacian filter, a sobel filter, a roberts filter, and the like.

Also, the size of the first filter FIL1, the third filter FIL3 and the fourth filter FIL4 is small enough with respect to the image data D1 (FIG. 7), which is e.g., 5 pixels in X-axis direction.

<Example Determination Process (Step S3)>

Referring back to FIG. 4, in step S3, the image processing apparatus performs a determination process. That is, in step S3, the image processing apparatus determines whether the edge portion of the recording medium 2 is chipped. Additionally, a part of the determination process may be omitted.

Figure 9:
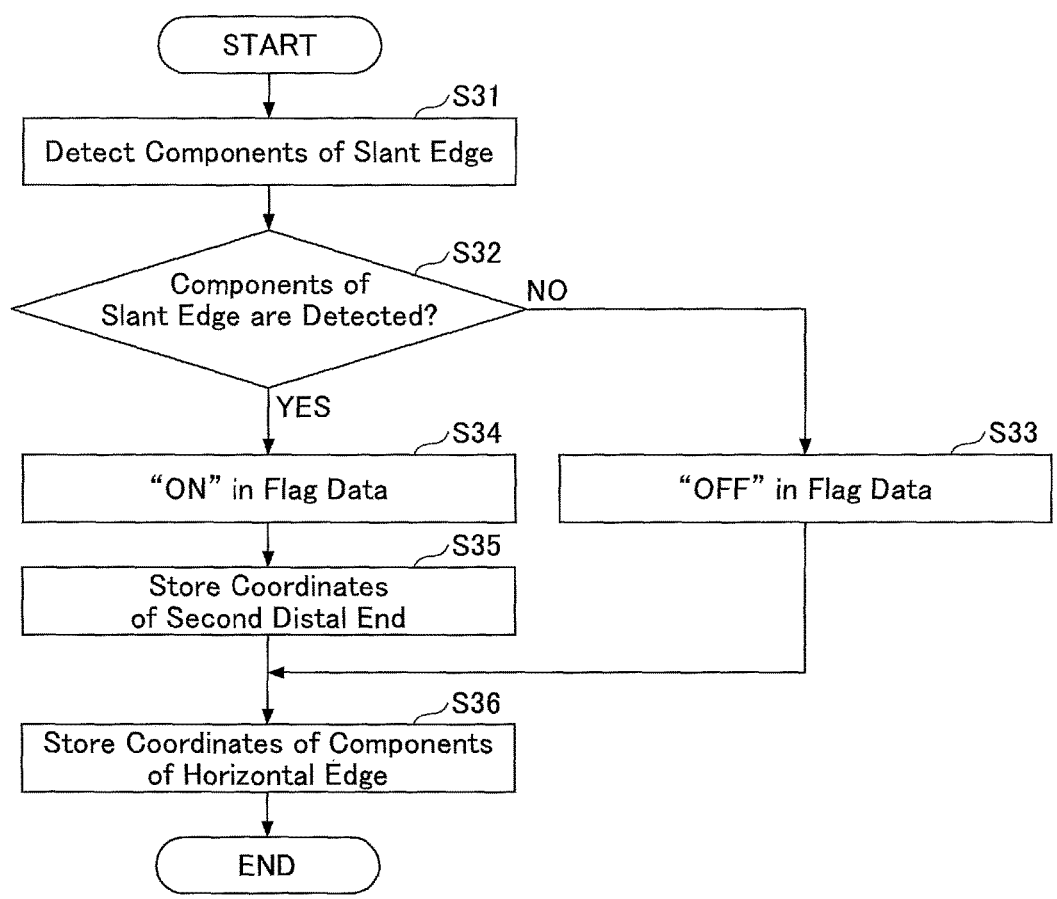
FIG. 9 is a flowchart for illustrating an example determination process performed by the image processing apparatus of the present embodiment.

FIG. 9 is a flowchart for illustrating an example determination process performed by the image processing apparatus of the present embodiment. In the following, descriptions are given in a case where the determination result indicating whether the edge portion of the recording medium 2 is chipped is output as flag data. <Example Detection of Component of Slanted edge (step S31)>

In step S31, the image processing apparatus detects the slanted edges included in the image generated in step S1 (FIG. 4). Specifically, in step S31, the image processing apparatus determines whether respective pixels whose coordinate of Y-axis is "0" are components of the slanted edges. In a case where all pixels whose coordinate of Y-axis is "0" are determined not to be the components of the slanted edges, the image processing apparatus determines whether respective pixels whose coordinate of Y-axis is "1" are components of the slanted edges. As described above, the image processing apparatus repeats to perform the determination whether respective pixels are components of the slanted edges along the conveyance direction Y (FIG. 3). That is, in step S31, the image processing apparatus determines whether the components of the slanted edges are included in respective rows.

<Example Determination Whether Components of Slanted Edges are Included (Step S32)>

In step S32, the image processing apparatus determines whether the component of the slanted edge is detected in step S31. Specifically, in a case where it is determined that the component of the slanted edge is detected in step S31 (YES in step S32), the process is forwarded to step S34. On the other hand, in a case where it is determined that the component of the slanted edge is not detected in step S31 (NO in step S32), the process is forwarded to step S33.

In the following, the determination result of the process of step S32 is stored as the flag data. Specifically, in a case where the slanted edge is included, a datum for indicating "ON" ("1" of a bit, etc.) is stored in the flag data. On the other hand, in a case where the slanted edge is not included, a datum for indicating "OFF" ("0" of a bit, etc.) is stored in the flag data.

<Example Process for Storing "OFF" in Flag Data (Step S33)>

In step S33, the image processing apparatus stores "OFF" in the flag data.

<Example Process for Storing "ON" in Flag Data (Step S34)>

In step S34, the image processing apparatus stores "ON" in the flag data.

It is determined whether the edge portion of the recording medium is chipped based on the flag data processed in step S33 or S34. When the edge portion of the recording medium is chipped, a datum indicating "ON" is stored in the flag data, and the image processing apparatus determines that the edge portion of the recording medium is chipped. In a case where it is determined that the edge portion of the recording medium is chipped, the image processing apparatus calculates the coordinates of the image range origin through the following processes.

<Example Process for Storing Second Distal End (Step S35)>

In step S35, the image processing apparatus detects a pixel positioned at the most left side among the pixels determined as the components of the slanted edge, that is, a distal end of the slanted edge (hereinafter referred to as a "second distal end"). Then, the image processing apparatus stores the coordinates of the detected second distal end.

<Example Process for Storing Coordinates of Edge Components (Step S36)>

In step S36, the image processing apparatus stores the coordinates of pixels determined to be included in the edge. Additionally, the coordinates of all the pixels determined to be included in the edge may not be stored, but the coordinates of only several representing pixels may be stored. In the following, descriptions are given in a case where the coordinates of several representing pixels are stored.

<Example Coordinates Calculation (Step S4)>

Referring back to FIG. 4, in step S4, the image processing apparatus calculates the coordinates of the image range origin.

Figure 10:
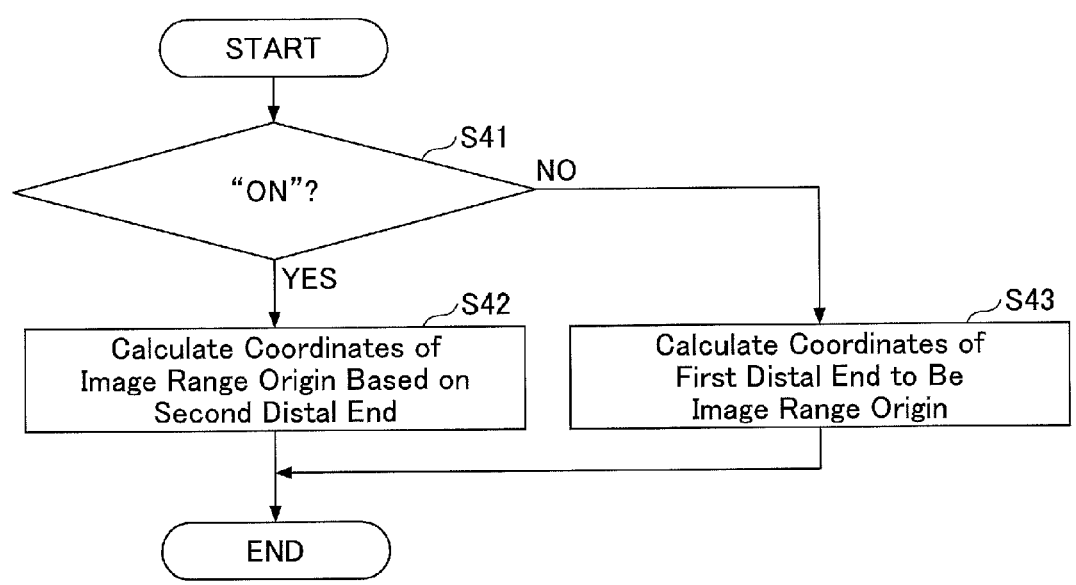
FIG. 10 is a flowchart for illustrating an example coordinates calculation performed by the image processing apparatus of the present embodiment.

FIG. 10 is a flowchart for illustrating an example coordinates calculation performed by the image processing apparatus of the present embodiment. Additionally, the process shown in FIG. 10 is an example of the process of step S4 shown in FIG. 4.

<Example Determination Whether Flag Data is "ON" (Step S41)>

In step S41, the image processing apparatus determines whether the datum indicating "ON" is stored in the flag data. Specifically, the datum indicating either "ON" or "OFF" is stored in the flag data through the processes of step S33 or S34 shown in FIG. 9. Therefore, in a case where the datum indicating "ON" is stored in the flag data (YES in step S41), the process is forwarded to step S42. On the other hand, in a case where the datum indicating "ON" is not stored in the flag data (NO in step S41), the process is forwarded to step S43.

<Example Process for Calculating the Coordinates of Image Range Origin Based on Formula Expressing Horizontal Edge and Second Distal End (Step S42)>

In step S42, the image processing apparatus finds a formula expressing horizontal edge in a two-dimensional plane and calculates the coordinates of the image range origin based on the formula and the second distal end. Specifically, in step S42, for example, the image processing apparatus finds the formula expressing horizontal edge by using least squares method based on the respective coordinates including the coordinates of the representing pixels stored in step S36 shown in FIG. 9, and the like. Also, in step S42, the image processing apparatus calculates the coordinates of the image range origin in accordance with the formula expressing horizontal edge and the second distal end.

Figure 11:
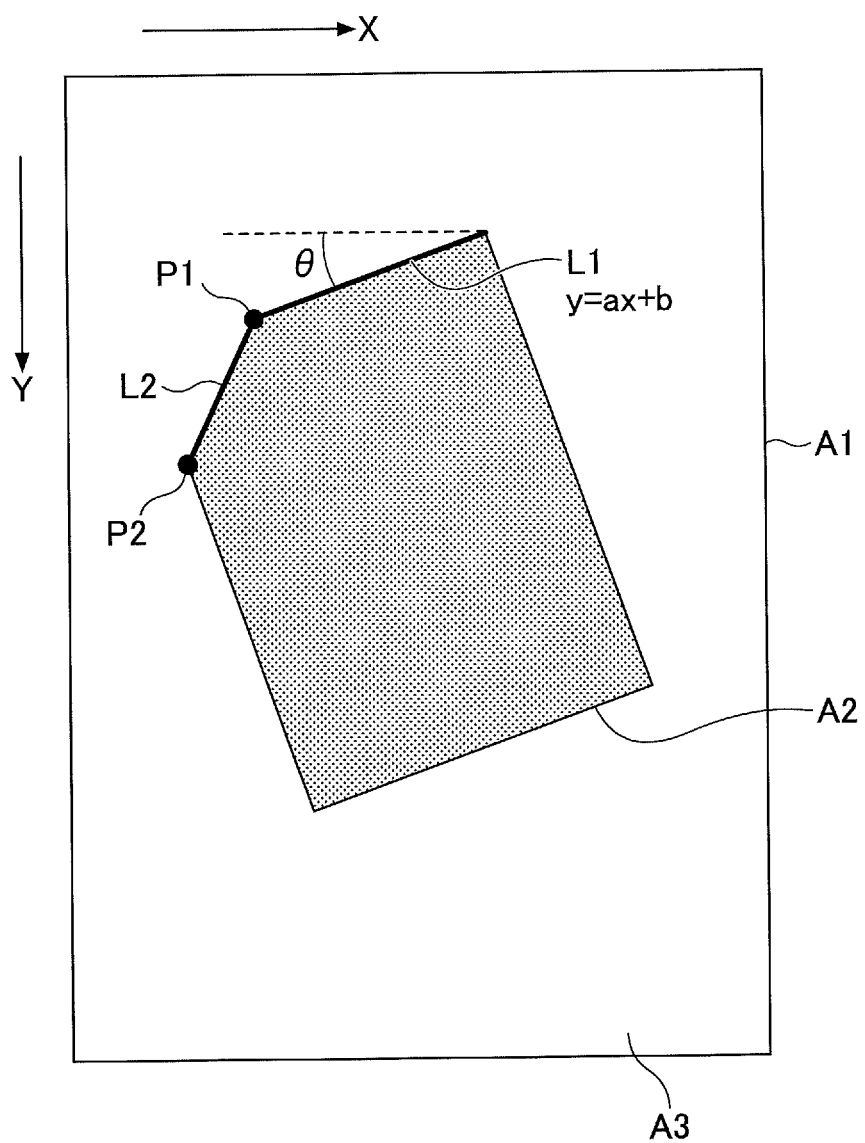
FIG. 11 is a diagram for illustrating an example formula for expressing a horizontal edge and a second distal end of the present embodiment.

FIG. 11 is a diagram for illustrating an example formula for expressing the horizontal edge and the second distal end of the present embodiment. Specifically, coefficients of the formula for expressing the horizontal edge L1 are calculated based on the respective coordinates of the pixels including the coordinates of the representing pixels stored in step S36 (FIG. 9) by using the least squares method. In the following, the formula for expressing the horizontal edge L1 is shown as y=ax+b. Also, coordinates of a pixel positioned at the most left side among the pixels included in the horizontal edge L1, that is, the distal end P1 of the horizontal edge (hereinafter, referred to as "first distal end"), etc., are calculated.

Figure 12:
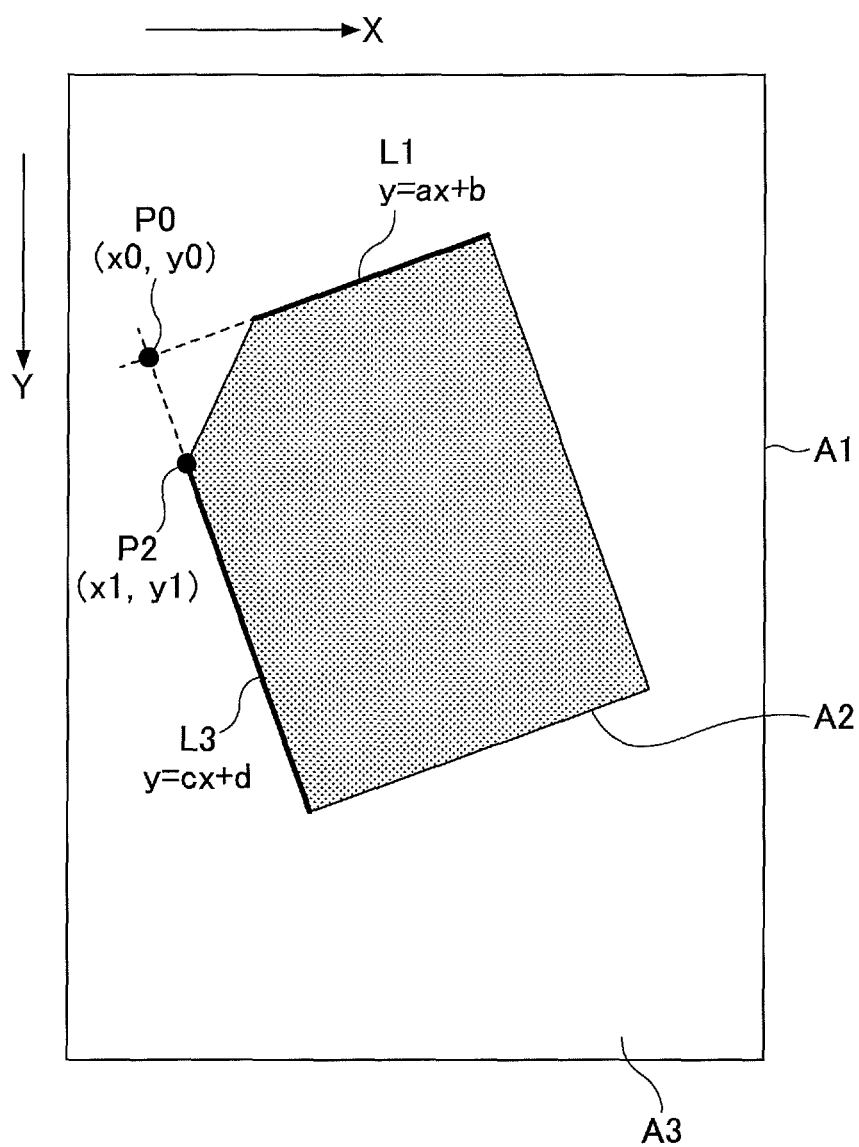
FIG. 12 is a diagram for illustrating an example calculation of the image range origin performed by the image processing apparatus of the present embodiment.

FIG. 12 is a diagram for illustrating an example calculation of the image range origin performed by the image processing apparatus of the present embodiment. In FIG. 12, the coordinates of the second distal end P2 are shown as P2 (x1, y1).

The image processing apparatus finds a formula for expressing the vertical edge L3. Additionally, the formula for expressing the vertical edge L3 is shown as y=cx+d. Specifically, a gradient coefficient "c" of the formula of the vertical edge L3 is calculated as "1/a" and an intercept coefficient d of the formula of the vertical edge L3 is calculated as "y1−c×x1" wherein the horizontal edge L1 is expressed by y=ax+b since the horizontal edge L1 is orthogonal to the vertical edge L3 when they are extended.

The image processing apparatus further calculates the coordinates of the image range origin P0 based on the formula for expressing the horizontal edge L1 and the formula for expressing the vertical edge L3. Additionally, the coordinates of the image range origin P0 are expressed as P0 (x0, y0). Specifically, in FIG. 12, the image range origin P0 is a point at intersection of the extended horizontal edge L1 and the extended vertical edge L3. Therefore, the image processing apparatus can calculate the coordinates P0 (x0, y0) of the image range origin P0 as follows. x0=(d−b)/(a−c) y0=a×x0+b <Example Generation of Formula for Expressing Horizontal Edge as First Distal End is Image Range Origin (Step S43)>

Referring back to FIG. 10, in step S43, the image processing apparatus sets the first distal end to be the image range origin. In a case where it is determined that the edge portion of the recording medium is not chipped (flag data is "OFF"), the image processing apparatus sets the image range origin P0 to be the distal end P1 corresponding to a pixel positioned at most left side in the horizontal edge.

Figure 13A:
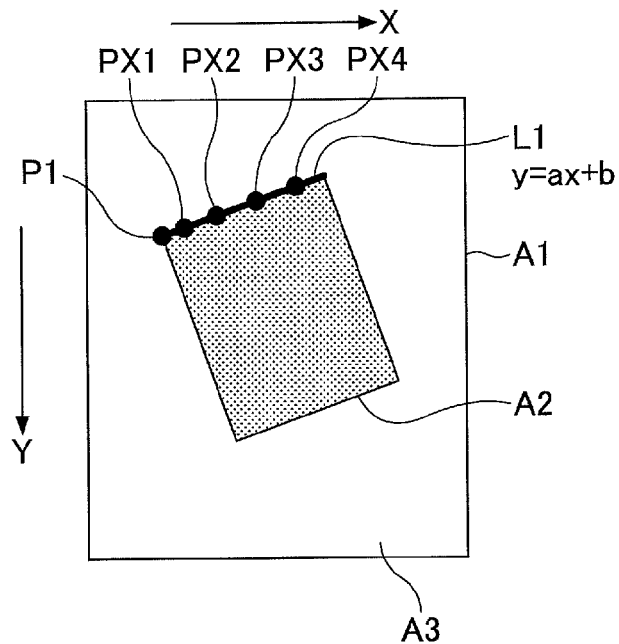
FIG. 13A is a diagram for illustrating an example generation of a formula for expressing the horizontal edge.
Figure 13B:
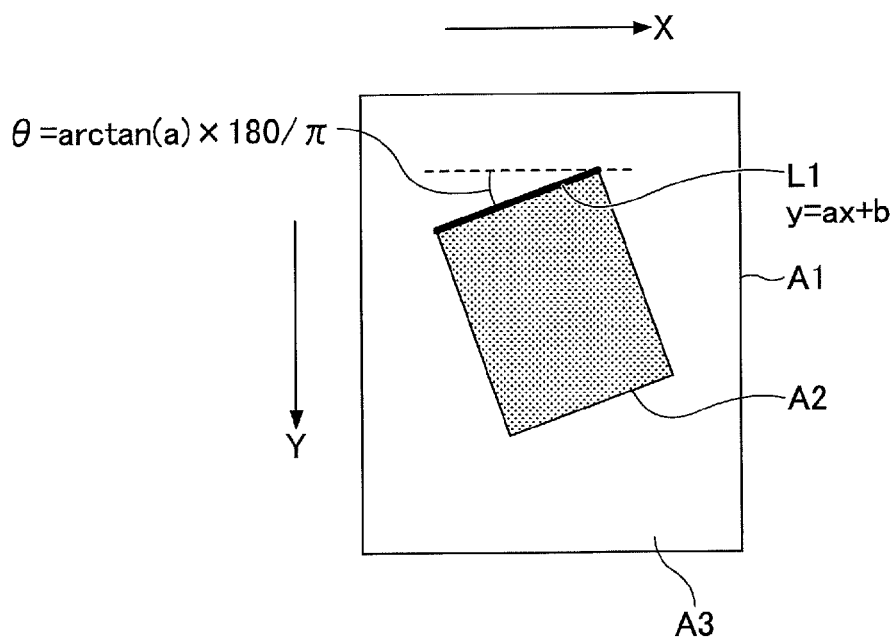
FIG. 13B is another diagram for illustrating an example generation of a formula for expressing the horizontal edge.

FIG. 13A and FIG. 13B are diagrams for illustrating an example generation of the formula for expressing a straight line corresponding to the horizontal edge performed by the image forming apparatus of the present embodiment. Additionally, the generation process shown in FIG. 13A and FIG. 13B is an example of the process of step S43. Also, FIG. 13A and FIG. 13B are shown assuming that the image data shown in FIG. 3A is generated in step S1.

In FIG. 13A and FIG. 13B, pixels included in the horizontal edge L1 among pixels included in the image range A2 are stored as the components of the horizontal edge in step S36 (FIG. 9). Further, among the pixels corresponding to the components of the horizontal edge L1, a pixel positioned at the most left side is detected as the first distal end P1. That is, as shown in FIG. 13A, the first distal end P1 corresponds to the pixel that is positioned at the most left side among the pixels included in the horizontal edge L1.

Also, for example, in a case where four pixels are detected as the representing pixels, a first pixel PX1, a second pixel PX2, a third pixel PX3 and a fourth pixel PX4 are detected as the components of the horizontal edge L1.

In step S43, the image processing apparatus calculates the coefficients of the formula "y=ax+b" based on respective coordinates of the first pixel PX1, the second pixel PX2, the third pixel PX3 and the fourth pixel PX4 by using the least squares method, etc., to generate the formula for expressing the horizontal edge L1.

Additionally, in step S43, the image processing apparatus may calculate the skew angle θ based on the formula "y=ax+b" for expressing the horizontal edge L1. For example, as shown in FIG. 13B, the skew angle θ is calculated based on the gradient coefficient "a" of the formula for expressing the horizontal edge L1.

<Example Functional Configuration>

Figure 14:
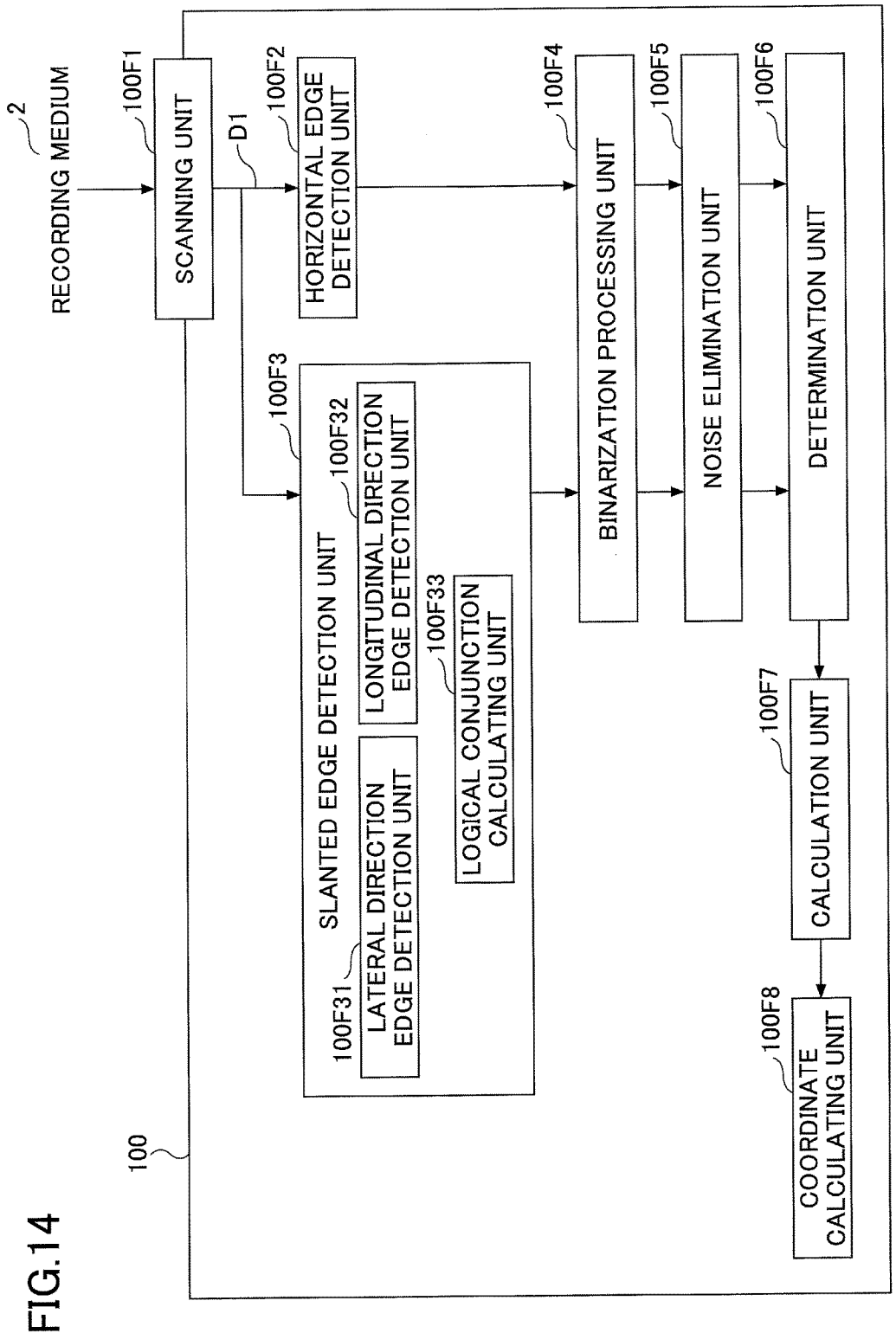
FIG. 14 is a block diagram for illustrating an example functional configuration of the image processing apparatus of the first embodiment.

FIG. 14 is a block diagram for illustrating an example functional configuration of the image processing apparatus of the first embodiment. Specifically, the image processing apparatus 100 includes a scanning unit 100F1, a horizontal edge detection unit 100F2, a slanted edge detection unit 100F3, a binarization processing unit 100F4, a noise elimination unit 100F5, a determination unit 100F6, a calculation unit 100F7 and a coordinate calculating unit 100F8.

The scanning unit 100F1 scans the image formed on the recording medium 2 to generate the image data D1. Specifically, for example, the scanning unit 100F1 scans the recording medium 2, etc., to generate the image data D1 shown in FIG. 7. Additionally, for example, the scanning unit 100F1 is achieved by the image reading unit 300 (FIG. 1), and the like.

The horizontal edge detection unit 100F2 detects the horizontal edge L1 (FIG. 7) from the image data D1 by using the first filter FIL1 (FIG. 8). Additionally, for example, the horizontal edge detection unit 100F2 is achieved by the CPU 100H1 (FIG. 2), the ASIC 100H2 (FIG. 2), and the like.

The horizontal edge detection unit 100F3 includes a lateral direction edge detection unit 100F31, a longitudinal direction edge detection unit 100F32, and a logical conjunction calculating unit 100F33. Additionally, for example, the slanted edge detection unit 100F3 is achieved by the CPU 100 H1, the ASIC 100H2, and the like.

The lateral direction edge detection unit 100F31 detects the lateral direction edge LH (FIG. 7) from the image data D1 by using the third filter FIL3 (FIG. 8).

The longitudinal direction edge detection unit 100F32 detects the longitudinal direction edge LV (FIG. 7) from the image data D1 by using the fourth filter FIL4 (FIG. 8).

The logical conjunction calculating unit 100F33 calculates the logical conjunction of the detection result of the lateral direction edge detection unit 100F31 and the detection result of the longitudinal direction edge detection unit 100F32.

The binarization processing unit 100F4 binarizes the image data processed by the horizontal edge detection unit 100F2 and the slanted edge detection unit 100F3. Additionally, for example, the binarization processing unit 100F4 is achieved by the CPU 100H1, the ASIC 100H2, and the like.

The noise elimination unit 100F5 eliminates noise from the image data processed by the binarization processing unit 100F4. Additionally, for example, the noise elimination unit 100F5 is achieved by the CPU 100H1, the ASIC 100H2, and the like.

The determination unit 100F6 determines whether the edge portion of the recording medium 2 is chipped based on the detection result of the horizontal edge detection unit 100F2 and the slanted edge detection unit 100F3. Additionally, the determination unit 100F6 is achieved by the CPU 100H1, the ASIC 100H2, and the like.

The calculation unit 100F7 calculates the coordinates of the second distal end P2 (FIG. 11) based on the slanted edge L2 detected by the slanted edge detection unit 100F3. Further, the calculation unit 100F7 generates the formula "y=ax+b" (FIG. 11) for expressing the horizontal edge L1 based on the representing pixels such as the first pixel PX1 (FIG. 7) included in the horizontal edge L1 detected by the horizontal edge detection unit 100F2. Additionally, for example, the calculation unit 100F7 is achieved by the CPU 100H1, the ASIC 100H2, and the like.

For example, in a case where the edge portion of the recording medium 2 is chipped, the coordinate calculating unit 100F8 calculates the coordinates of the image range origin P0, as shown in FIG. 12, based on the formula "y=ax+b" for expressing the horizontal edge L1 and the second distal end P2. Additionally, the coordinate calculating unit 100F8 is achieved by the CPU 100H1, the ASIC 100H2, and the like.

The image processing apparatus 100 scans the image formed on the recording medium 2 to generate the image data D1. Then, the image processing apparatus 100 extracts the slanted edges from the image data D1 by using the slanted edge detection unit 100F3. That is, the image processing apparatus 100 can detect the slanted edge L2 by using the slanted edge detection unit 100F3. Therefore, the image processing apparatus 100 can determine whether the edge portion of the recording medium 2 is chipped based on the detection result of the determination unit 100F6 indicating whether the slanted edge L2 is detected. Hence, the image processing apparatus 100 can calculate the coordinates of the edge portion of the recording medium 2 regardless of whether the edge portion of the recording medium 2 is chipped.

Also, since the coordinates of the image range origin P0 are calculated regardless whether the edge portion of the recording medium 2 is chipped or not, the image processing apparatus 100 can perform correction process such as the skew correction for rotating the image about the coordinates of the image range origin P0.

Figure 15A:
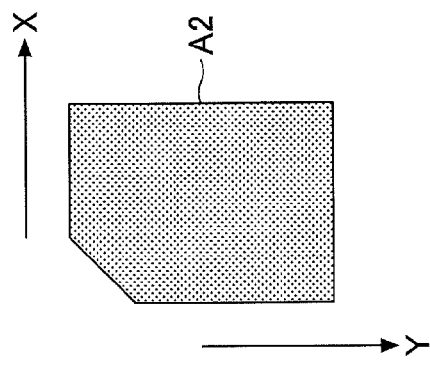
FIG. 15A is a diagram for illustrating an example processing result of the skew correction of the image processing apparatus of the present embodiment.
Figure 15B:
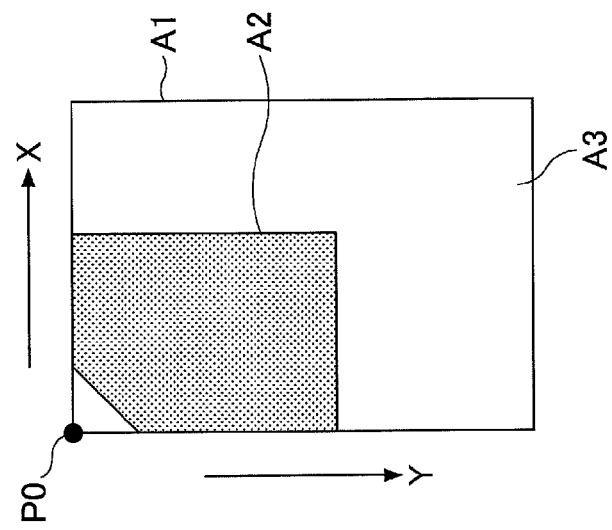
FIG. 15B is another diagram for illustrating an example processing result of the skew correction of the image processing apparatus of the present embodiment.
Figure 15C:
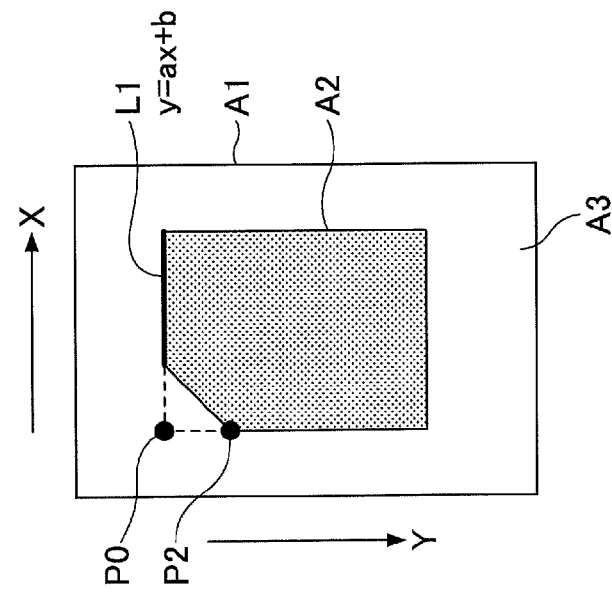
FIG. 15C is a diagram for illustrating an example processing result of the skew correction of the image processing apparatus of the present embodiment.

FIG. 15A, FIG. 15B and FIG. 15C are diagrams for illustrating an example processing result of the skew correction performed by the image processing apparatus of the present embodiment. Specifically, FIG. 15A-FIG. 15C are diagrams for illustrating an example process of the skew correction shown in FIG. 3 performed on the recording medium 2 shown in FIG. 6A by the image processing apparatus of the present embodiment.

In a case where the edge portion of the recording medium 2 is chipped, the image processing apparatus generates the formula "y=ax+b" for expressing the horizontal edge L1 and calculates the second distal end P2. Upon generating the formula "y=ax+b" for expressing the horizontal edge L1 and calculating the second distal end P2, the image processing apparatus calculates the image range origin P0, thereby generating the image without the skew angle as shown in FIG. 15A.

Upon calculating the image range origin P0, in the process shown in FIG. 3C, the image processing apparatus can move the image range A2 so that the image range origin P0 is positioned at the image range origin of the scan range A1 as shown in FIG. 15B. Therefore, as shown in FIG. 15C, the image processing apparatus can perform the skew correction without eliminating a part of or all of the image range A2.

Also, since the image processing apparatus calculates the image range origin P0 based on the formula "y=ax+b" for expressing the horizontal edge L1 and the second distal end P2, the image range origin P0 can be calculated with a high precision even when the vertical streaks caused by the dusts and dirt are included in the image data.

Second Embodiment

For example, a second embodiment is achieved by the image processing apparatus 100 shown in FIG. 1 and FIG.

2. Therefore, descriptions on the general arrangement and the hardware configuration of the image processing apparatus 100 are omitted. Also, in the second embodiment, for example, the entire process shown in FIG. 4 is performed similarly to the first embodiment. However, in the second embodiment, the process related to the slanted edge detection process included in the edge detection process shown in FIG. 5 is different from that of the first embodiment. In the following, mainly, the difference will be described. Additionally, in the descriptions given below, identical reference numerals will be applied to an elements or the like that have substantially similar functions and configurations to those in the first embodiment, and descriptions thereof may be omitted.

FIG. 16 is a flowchart for illustrating an example edge detection process performed by the image processing apparatus of the second embodiment. In FIG. 16, processes of step S22 to step S24 in FIG. 5 are replaced with a process of step S201.

<Example Process for Detecting Slanted Edge by Second Filter (Step S201)>

In step S201, the image processing apparatus detects the slanted edge by using the second filter. Specifically, for example, the image processing apparatus performs a filter process by using a filter for performing first derivation in a direction slanted with respect to the orthogonal direction X (FIG. 3) on the image data generated in step S1. That is, upon performing the process of step S201, pixels are detected, where the respective differences of pixel value of the detected pixel and pixel adjacent to the detected pixels in slanted direction is greater than or equal to a certain value.

<Example Filter>

Figure 17A:
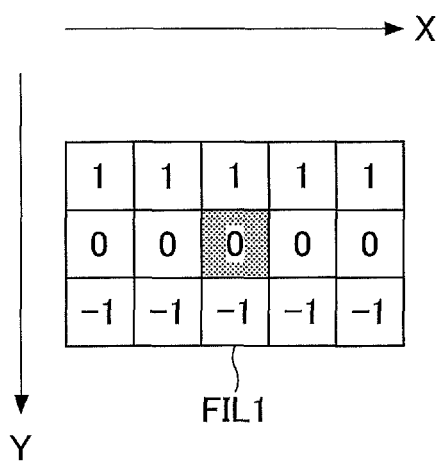
FIG. 17A is a diagram for illustrating an example filter of the second embodiment.
Figure 17B:
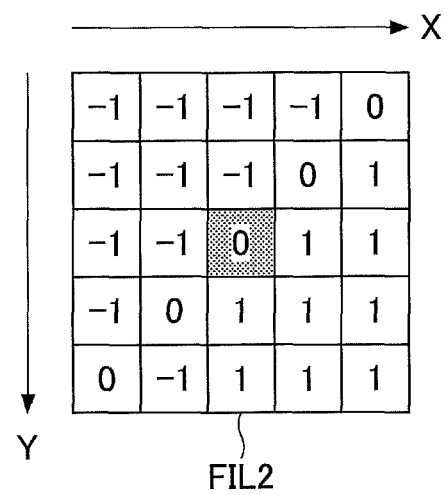
FIG. 17B is a diagram for illustrating another example filter of the second embodiment.

FIG. 17A and FIG. 17B are diagrams for illustrating example filters of the second embodiment. As shown in FIG. 17A and FIG. 17B, similarly to the first embodiment, for example, the horizontal edge is detected by the first filter FIL1 (step S21 shown in FIG. 15) in the second embodiment. On the other hand, in step S201 (FIG. 16), for example, the horizontal edge is detected by using the second filter FIL2.

Additionally, in step S201, slanted edges with a plurality of angles may be detected by using a plurality of second filters, where the plurality of types of the second filters are included in the image processing apparatus. For example, in step S201, the image processing apparatus includes a filter for detecting the slanted edge with angle 45° and a filter for detecting the slanted edge with angle 60° as the second filters, and performs the detection of the slanted edge a plurality of times by using the respective second filters. In this case, the slanted edges with angle 45° and angle 60° are respectively detected. The image processing apparatus may calculate the logical addition (OR) of the respective detection results so as to output the detection result of step S201. As described above, the image processing apparatus can detect more various slanted edges having various angles by detecting the slanted edges with the plurality of angles.

<Functional Configuration>

Figure 18:
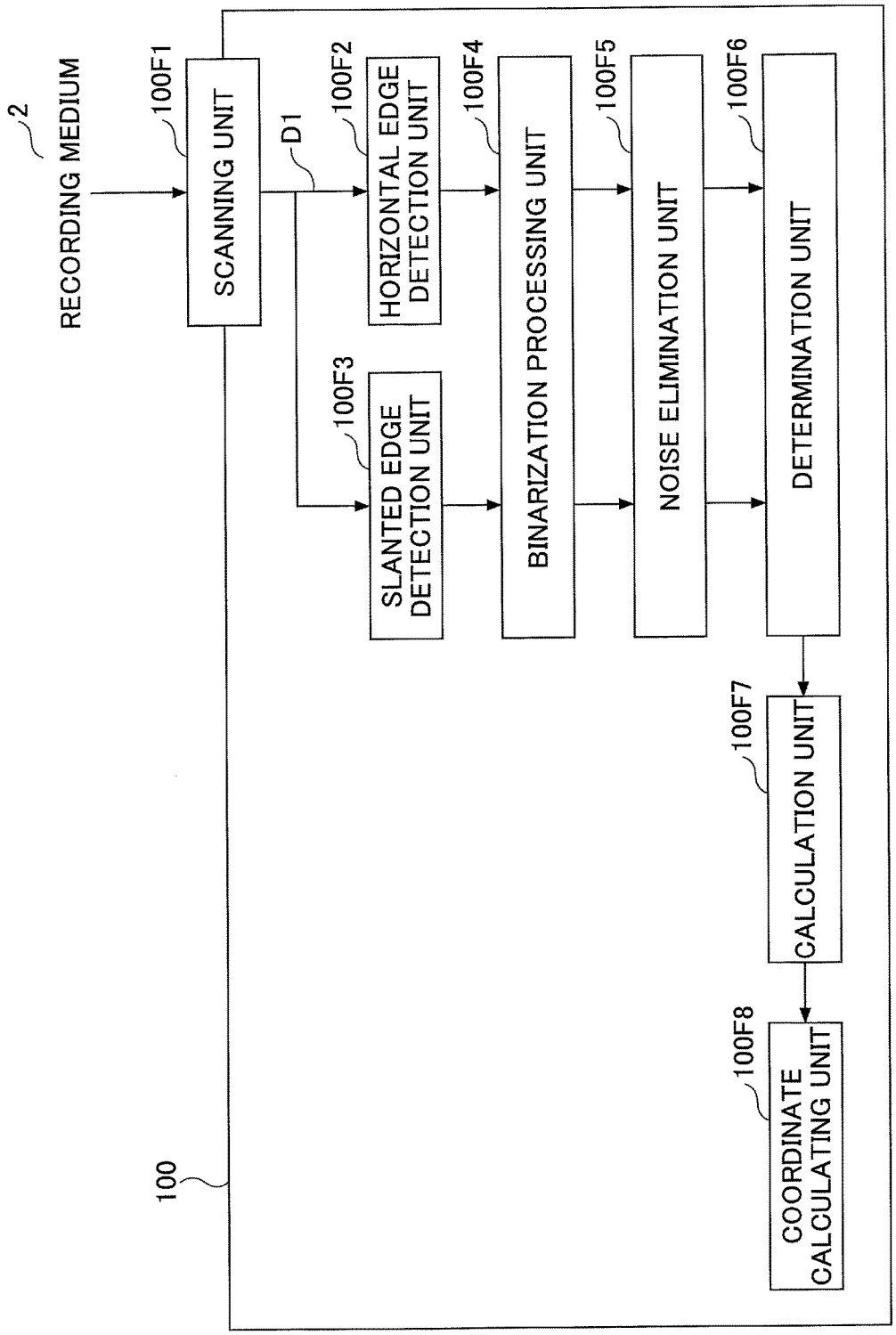
FIG. 18 is a block diagram for illustrating an example functional configuration of the image processing apparatus of the second embodiment.

FIG. 18 is a block diagram for illustrating an example functional configuration of the image processing apparatus of the second embodiment. Specifically, similarly to the first embodiment, for example, the image processing apparatus 100 includes a scanning unit 100F1, a horizontal edge detection unit 100F2, a slanted edge detection unit 100F3, a binarization processing unit 100F4, a noise elimination unit 100F5, a determination unit 100F6, a calculation unit 100F7 and a coordinate calculating unit 100F8.

In the second embodiment, the slanted edge detection unit 100F3 is different from slanted edge detection unit 100F3 of the first embodiment. In the following, mainly, the difference will be described.

The slanted edge detection unit 100F3 detects the slanted edge L2 (FIG. 7) from the image data D1 by using the second filter FIL2 (FIG. 17).

Similarly to the first embodiment, the image processing apparatus 100 scans the image formed on the recording medium 2 to generate the image data D1. Then, the image processing apparatus 100 detects the slanted edge L2 by using the slanted edge detection unit 100F3. Therefore, the image processing apparatus 100 can determine whether the edge portion of the recording medium 2 is chipped based on the detection result of the determination unit 100F6 indicating whether the slanted edge L2 is detected. Hence, the image processing apparatus 100 can calculate the coordinates of the edge portion of the recording medium 2 regardless of whether the edge portion of the recording medium 2 is chipped.

Also, similarly to the first embodiment, since the coordinates of the image range origin P0 can be calculated regardless of whether the edge portion of the recording medium 2 is chipped or not, the image processing apparatus 100 can perform correction process such as the skew correction for rotating the image about the coordinates of the image range origin P0.

Additionally, all of or part of the respective processes may be achieved by a computer readable and executable program described in a legacy programming language including assembler, C, C++, C#, Java, etc., or an object oriented programming language, and the like. That is, the program is a computer readable program for causing a computer such as an information processing system including one or more information processing apparatuses such as an image processing apparatus to perform the respective processes.

Also, the program may be stored in a computer readable recording medium such as a ROM, an EEPROM (Electrically Erasable Programmable ROM) to be distributed. Additionally, the recording medium may be an EPROM (Erasable Programmable ROM), a flash memory, a flexible disk, an optical disk such as a CD-ROM (Compact Disc-Read Only Memory), a SD card memory, MO, and the like. Further, the program may be distributed through an electronic communication line.

Further, the present embodiment may be achieved by an image processing system including one or more information processing apparatuses, and the like. Additionally, the image processing system may perform a part of or all of the respective processes in parallel, dispersedly, or redundantly.

<Example Comparison>

FIG. 19A-FIG. 19F are diagrams for illustrating an example processing result of the entire process performed by the image processing apparatus provided for purpose of comparison (image processing apparatus of an example comparison). Specifically, FIG. 19A-FIG. 19F are diagrams for illustrating the skew correction shown in FIG. 3A-FIG. 3D performed on the recording medium 2 shown in FIG. 6A by the image processing apparatus of the example comparison without including the slanted edge detection unit 100F3 (FIG. 14 and FIG. 18), or the like.

Figure 19C:
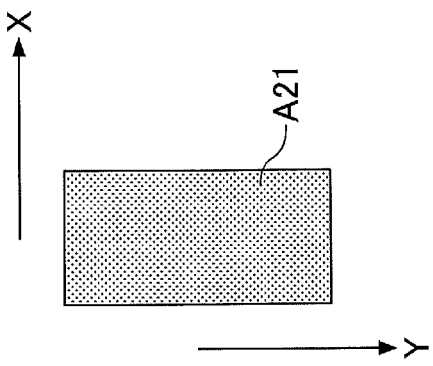
FIG. 19C is another diagram for illustrating an example processing result of the entire process performed by the image processing apparatus of an example comparison.
Figure 19B:
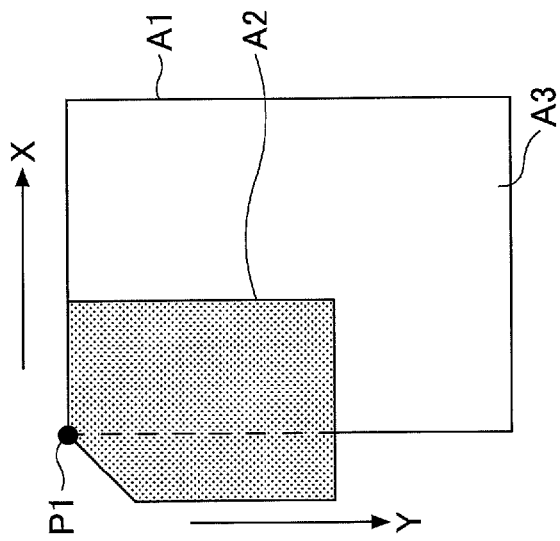
FIG. 19B is another diagram for illustrating an example processing result of the entire process performed by the image processing apparatus of an example comparison.
Figure 19A:
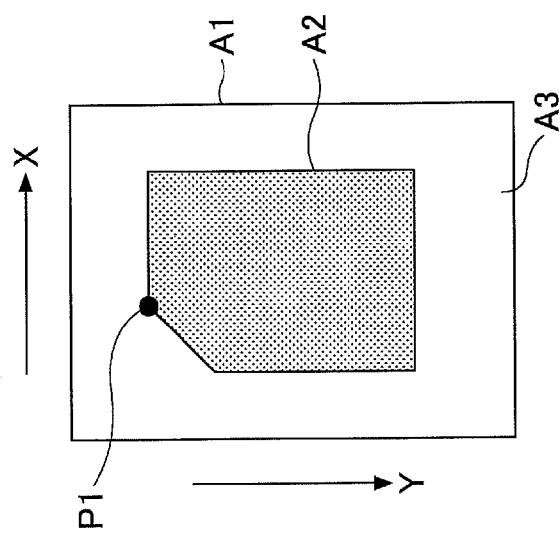
FIG. 19A is a diagram for illustrating an example processing result of the entire process performed by the image processing apparatus of an example comparison.

For example, in a case where the edge portion of the recording medium 2 is chipped as shown in FIG. 6A, the image processing apparatus of the example comparison may find the first distal end P1 as the image range origin P0 (FIG. 15) as shown in FIG. 19A. In this case, upon the first distal end P1 being found as the image range origin P0, the image processing apparatus of the example comparison moves the image range A2 so that the first distal end P1 is positioned at the origin of the scan range A1 as shown in FIG. 19B when the process shown in FIG. 3C is performed. Therefore, in a case where the process shown in FIG. 3C is performed by the image processing apparatus of the example comparison, a left side portion of the image range A2 may be excluded from the scan range A1. Hence, as shown in FIG. 19C, an image range A21 generated by eliminating the left side portion of the image range A2 may be output.

Also, for example, in a case where the edge portion of the recording medium 2 is chipped as shown in FIG. 6A, the image processing apparatus of the example comparison may find the second distal end P2 as the image range origin P0 as shown in FIG. 19D. In this case, upon the second distal end P2 being found as the image range origin P0, the image processing apparatus of the example comparison moves the image range A2 so that the second distal end P2 is positioned at the origin of the scan range A1 as shown in FIG. 19E when the process shown in FIG. 3C is performed. Therefore, in a case where the process shown in FIG. 3C is performed by the image processing apparatus of the example comparison, an upper side portion of the image range A2 may be excluded from the scan range A1. Hence, as shown in FIG. 19F, an image range A22 generated by eliminating the upper side portion of the image range A2 may be output.

<Another Example Comparison>

Figure 20:
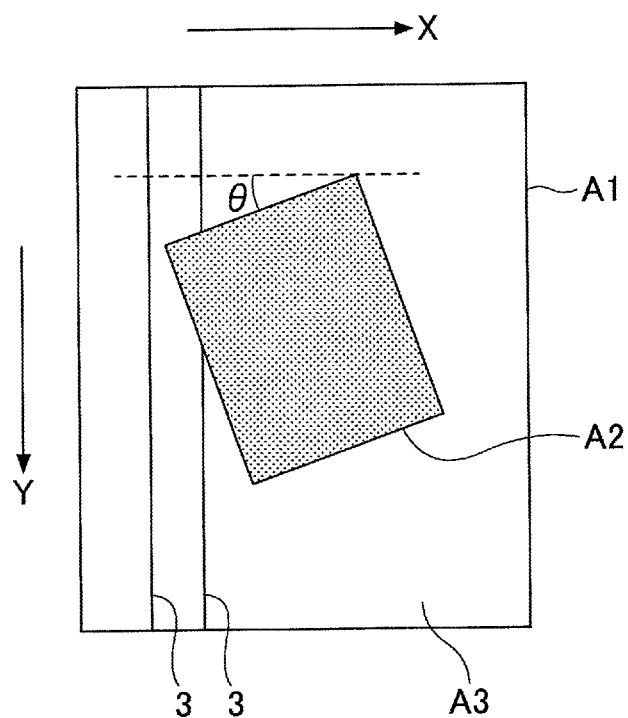
FIG. 20 is a diagram for illustrating an example processing result of the entire process performed by the image processing apparatus of another example comparison.

FIG. 20 is a diagram for illustrating an example processing result of the entire process performed by the image processing apparatus of another example comparison. Specifically, FIG. 20 is a diagram for illustrating an example skew correction shown in FIG. 3A-FIG. 3D performed by the image processing apparatus of the other example comparison including a detection unit for detecting the vertical edge L3 (FIG. 12).

For example, in a case where toner, or dusts and dirt adherer to a background plate included in the image processing apparatus of the other example comparison, as shown in FIG. 20, image data including vertical streaks 3 may be generated in a scanning process shown in FIG. 3A. In this case, the detection unit for detecting the vertical edge may detect any one of the vertical streaks 3 as the vertical edge L3 in the image processing apparatus of the other example comparison.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application is based on Japanese Priority Application No. 2015-019062 filed on Feb. 3, 2015, and Japanese Priority Application No. 2015-142381 filed on Jul. 16, 2015, the entire contents of which are hereby incorporated herein by reference.

What is claimed is:

1. An image processing apparatus for performing image processing on image data generated based on an image of a recording medium conveyed in a conveyance direction, comprising:
a processor,
a circuitry that is configured to perform a method, and
a memory that is coupled to the processor and stores a program, that, when executed, cause the processor to alternatively perform the method,
said method including the steps of:
detecting a horizontal edge included in the image data;
detecting a lateral direction edge including the horizontal edge and a slanted edge from the image data;
detecting a longitudinal direction edge including a vertical edge and the slanted edge from the image data;
detecting a slanted edge that is detected by calculating a logical conjunction of the detection result of the lateral direction edge and the longitudinal direction edge;
calculating coordinates of a distal end of the slanted edge, the other distal end of the slanted edge adjoining the horizontal edge; and
calculating coordinates related to an edge of the recording medium based on the horizontal edge and the calculated coordinates of the distal end, and
correcting a skew of the image of the recording medium based on the coordinates related to the edge of the recording medium,
wherein the method is alternatively performed by both of the circuitry and the processor, and
wherein the method includes calculating the logical conjunction of the detection result of the lateral direction edge and the detection result of the longitudinal direction edge so as to detect only edges that are present in both the detection result of the lateral direction edge and the detection result of the longitudinal direction edge and eliminate noise that is present in only one of the detection result of the lateral direction edge and the detection result of the longitudinal direction edge.

2. The image processing apparatus as claimed in claim 1, wherein the method includes:
detecting the horizontal edge from the image data by a first filter, and
detecting the slanted edge from the image data by a second filter.

3. The image processing apparatus as claimed in claim 2, wherein the method includes:
respectively detecting a plurality of types of the slanted edges by a plurality of filters;
performing the detection a plurality of times by using the respective filters included in the second filter.

4. The image processing apparatus as claimed in claim 3, wherein the detecting the slanted edges is performed by calculating a logical addition (OR) of detection results of each of the plurality of filters.

5. The image processing apparatus as claimed in claim 2, wherein
the first filter and the second filter are respectively filters for performing first derivation.

6. The image processing apparatus as claimed in claim 1, wherein the method includes:
detecting the horizontal edge by a first filter,
detecting a lateral direction edge including the horizontal edge and the slanted edge from the image data; and
detecting a longitudinal direction edge including a vertical edge and the slanted edge from the image data; and
wherein the method includes calculating a logical conjunction of the detection result of the lateral direction edge by the third filter and the detection result of the longitudinal direction edge by the fourth filter.

7. The image processing apparatus as claimed in claim 6, wherein
the first filter, the third filter and the fourth filter are respectively filters for performing first derivation.

8. The image processing apparatus as claimed in claim 6, wherein the method includes calculating the logical conjunction of the detection result of the lateral direction edge by the third filter and the detection result of the longitudinal direction edge by the fourth filter and detect an edge that is detected by both of the third and fourth filters.

9. The image processing apparatus as claimed in claim 1, the method includes:
   determining whether the edge of the recording medium is chipped based on the detection result of the slanted edge.

10. The image processing apparatus as claimed in claim 1, wherein a correction process is performed on the image data, in which the image of the image data is rotated about the a point indicated by the calculated coordinates.

11. The image processing apparatus as claimed in claim 1, wherein the method includes:
   generating a first formula for expressing the horizontal edge in a two-dimensional plane and a second formula for expressing a straight line orthogonal to the horizontal edge including the distal end in the two-dimensional plane, and
   finding a point at intersection of the horizontal edge expressed by the first formula and the straight line expressed by the second formula.

12. An image processing method of an image processing apparatus for performing image processing on image data generated based on an image of a recording medium conveyed in a conveyance direction, the method comprising:
   detecting a horizontal edge included in the image data;
   detecting a lateral direction edge including the horizontal edge and a slanted edge from the image data;
   detecting a longitudinal direction edge including a vertical edge and the slanted edge from the image data;
   detecting a slanted edge that is detected by calculating a logical conjunction of the detection result of the lateral direction edge and the longitudinal direction edge, the logical conjunction of the detection result of the lateral direction edge and the detection result of the longitudinal direction edge being calculated by detecting only edges that are present in both the detection result of the lateral direction edge and the detection result of the longitudinal direction edge and eliminating noise that is present in only one of the detection result of the lateral direction edge and the detection result of the longitudinal direction edge;
   calculating coordinates of a distal end of the slanted edge, the other distal end of the slanted edge adjoining the horizontal edge;
   calculating coordinates related to an edge of the recording medium based on the horizontal edge and the calculated coordinates of the distal end, and
   correcting a skew of the image of the recording medium based on the coordinates related to the edge of the recording medium.

13. A non-transitory computer-readable recording medium having stored therein a program for causing a computer to perform a method of image processing on image data generated based on an image of a recording medium conveyed in a conveyance direction, the method comprising:
   detecting a horizontal edge included in the image data;
   detecting a lateral direction edge including the horizontal edge and a slanted edge from the image data;
   detecting a longitudinal direction edge including a vertical edge and the slanted edge from the image data;
   detecting a slanted edge that is detected by calculating a logical conjunction of the detection result of the lateral direction edge and the longitudinal direction edge, the logical conjunction of the detection result of the lateral direction edge and the detection result of the longitudinal direction edge being calculated by detecting only edges that are present in both the detection result of the lateral direction edge and the detection result of the longitudinal direction edge and eliminating noise that is present in only one of the detection result of the lateral direction edge and the detection result of the longitudinal direction edge;
   calculating coordinates of a distal end of the slanted edge, the other distal end of the slanted edge adjoining the horizontal edge;
   calculating coordinates related to an edge of the recording medium based on the horizontal edge and the calculated coordinates of the distal end, and
   correcting a skew of the image of the recording medium based on the coordinates related to the edge of the recording medium.

\* \* \* \* \*